(12) United States Patent
Tsuchida

(10) Patent No.: US 12,535,566 B2
(45) Date of Patent: Jan. 27, 2026

(54) OPTICAL MEASUREMENT DEVICE AND MEASUREMENT METHOD

(71) Applicant: NATIONAL INSTITUTE OF ADVANCED INDUSTRIAL SCIENCE AND TECHNOLOGY, Tokyo (JP)

(72) Inventor: Hidemi Tsuchida, Tsukuba (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 889 days.

(21) Appl. No.: 17/788,366

(22) PCT Filed: Oct. 29, 2020

(86) PCT No.: PCT/JP2020/040616
§ 371 (c)(1),
(2) Date: Jun. 23, 2022

(87) PCT Pub. No.: WO2021/131315
PCT Pub. Date: Jul. 1, 2021

(65) Prior Publication Data
US 2023/0052690 A1    Feb. 16, 2023

(30) Foreign Application Priority Data
Dec. 25, 2019    (JP) .................. 2019-234644

(51) Int. Cl.
*G01C 3/08*    (2006.01)
*G01S 7/48*    (2006.01)
(Continued)

(52) U.S. Cl.
CPC ............ *G01S 7/493* (2013.01); *G01S 7/4808* (2013.01); *G01S 7/4917* (2013.01); *G01S 17/32* (2013.01); *G01S 17/58* (2013.01)

(58) Field of Classification Search
CPC ...... G01S 7/493; G01S 7/4808; G01S 7/4917; G01S 17/32; G01S 17/58
See application file for complete search history.

(56) References Cited

U.S. PATENT DOCUMENTS

| 4,846,571 A | 7/1989 | Jelalian et al. ............ 356/6 |
| 6,573,982 B1 * | 6/2003 | Pruitt .............. G01S 17/26 342/132 |

(Continued)

FOREIGN PATENT DOCUMENTS

| EP | 2405286 A1 | 1/2012 |
| JP | 2010-203884 A | 9/2010 |

(Continued)

OTHER PUBLICATIONS

Extended European Search Report dated Sep. 29, 2023, issued in corresponding European Patent Application No. 20907087.9.

(Continued)

*Primary Examiner* — Mark Hellner
(74) *Attorney, Agent, or Firm* — OSTROLENK FABER LLP

(57) ABSTRACT

An optical measurement device includes at least a multi-frequency laser configured to simultaneously generate a frequency-fixed carrier and at least one frequency-modulated subcarrier, an optical branching element, a dual frequency beat signal generator, a difference signal generator, and an arithmetic processing unit. Either the carrier or the subcarrier within the output light of the multi-frequency laser is used as first measurement light and either the carrier or the subcarrier having a frequency different from that of the first measurement light is used as second measurement light. The dual frequency beat signal generator separates and outputs a first complex beat signal derived from the first measurement light and a second complex beat signal derived from the second measurement light. The difference signal (Continued)

generator outputs a difference signal between the first complex beat signal and the second complex beat signal.

18 Claims, 14 Drawing Sheets

(51) Int. Cl.
*G01S 7/4912* (2020.01)
*G01S 7/493* (2006.01)
*G01S 17/32* (2020.01)
*G01S 17/58* (2006.01)

(56) References Cited

U.S. PATENT DOCUMENTS

2019/0293794 A1* 9/2019 Zhang .................. G01S 7/4817
2021/0096444 A1* 4/2021 Zhang .................. G02F 1/3536

FOREIGN PATENT DOCUMENTS

| JP | 2014-185956 A | 10/2014 |
| JP | 2018-520346 A | 7/2018 |
| JP | 2019-045200 A | 3/2019 |
| WO | WO 2008/105322 A1 | 9/2008 |
| WO | WO 2016/210401 A1 | 12/2016 |
| WO | WO 2018/070442 A1 | 4/2018 |
| WO | WO 2018/230474 A1 | 12/2018 |

OTHER PUBLICATIONS

International Search Report, mailed Dec. 8, 2020, issued in corresponding PCT International Application No. PCT/JP2020/040616.
J. Qin et al., "Coherence enhancement of a chirped DFP laser for frequency-modulated continuous-wave reflectometry using a composite feedback loop", *Optics Letters*, vol. 40, No. 19, pp. 4500-4503 (2015).

* cited by examiner

OPTICAL MEASUREMENT DEVICE AND MEASUREMENT METHOD

CROSS-REFERENCE TO RELATED APPLICATIONS

The present application is a 35 U.S.C. §§ 371 national stage application of PCT/JP2020/040616, filed Oct. 29, 2020, which claims priority to Japanese Patent Application No. 2019-234644 filed on Dec. 25, 2019, the contents of which are incorporated herein by reference.

TECHNICAL FIELD

The present invention relates to an optical measurement device and a method suitable for environment recognition sensors for use in vehicles, autonomous robots, and the like.

BACKGROUND ART

Light imaging detection and ranging (LiDAR) is being developed for the purpose of application to environment recognition sensors mounted in vehicles and autonomous robots, shape measurement at construction and civil engineering sites, and the like. In the time of flight (ToF) type LiDAR, which has been put into practical use, a distance is measured based on time for the optical pulse irradiated to an object to be scattered and returned. Then, the three-dimensional distance data is generated by spatial scanning of the optical pulse.

ToF LiDAR is widely used because its measurement principle is simple and a device configuration thereof is also relatively simple. However, some problems are known, such as interference associated with sunlight and irradiation light from other devices; and an output power limit associated with the safety standards for laser light, and the like (eye safety regulations and the like). Contrary to that, the frequency modulated continuous wave (FMCW) method using coherent detection has advantages such as being capable of: detecting the scattered light with high sensitivity; and measuring not only the distance to object but the motion velocity of the object from the Doppler shift. FMCW radar of a millimeter wave band has been put into practical use for an in-vehicle collision prevention sensor. If FMCW LiDAR can be implemented in a light wave band, the spatial resolution and the positioning distance can be expected to be significantly improved.

FMCW LiDAR has a problem related to the non-linear chirp, which is associated with frequency modulation of laser. In FMCW LiDAR, it is assumed that the modulated laser frequency increases or decreases in proportion to time (a linear chirp) when a distance to an object and a speed of the object are obtained from a beat signal. However, it is known that there is noticeable deterioration on the non-liner chirp in the semiconductor laser that is frequency-modulated by an injection current. Accordingly, significant accuracy deterioration occurs.

The present inventor has reported a device and a method for solving the problem of the non-linear chirp related to FMCW LiDAR of the prior art. For example, the present inventor has proposed a device and a method for correcting a non-linear chirp in a regression analysis process for a beat signal (see Patent Literature 1). Also, the present inventor has proposed a device and a method for accurately calculating a distance from an average value of beat frequencies under the presence of a non-linear chirp (see Patent Literature 2).

Also, in FMCW LiDAR, a method of reducing the non-linear chirp and the phase noise using the negative feedback control of a laser has been reported (Non-Patent Literature 1).

Also, in the optical frequency domain reflectometry (OFDR), which measures a reflection distribution using a measurement principle similar to that of FMCW LiDAR, a method and a device for reducing an influence of the phase noise by a laser frequency measurement and calculation processing have been reported (see Patent Literature 3).

CITATION LIST

Patent Literature

[Patent Literature 1]
  PCT International Publication No. WO 2018/230474
[Patent Literature 2]
  Japanese Unexamined Patent Application, First Publication No. 2019-045200
[Patent Literature 3]
  PCT International Publication No. WO 2008/105322
[Patent Literature 4]
  PCT International Publication No. WO 2018/070442

Non-Patent Literature

[Non-Patent Literature 1]
  J. Qin, Q. Zhou, W. Xie, Y. Xu, S. Yu, Z. Liu, Y. T. Tong, Y. Dong, and W. Hu, "Coherence enhancement of a chirped DFB laser for frequency-modulated continuous-wave reflectometry using a composite feedback loop", Optics Letters, vol. 40, no. 19, pp. 4500-4503 (2015).

SUMMARY OF INVENTION

Technical Problem

One of the problems associated with FMCW LiDAR of the prior art is the limitation of a maximum measurement distance due to laser coherence. FMCW LiDAR uses coherent detection to mix scattered light from an object with reference light serving as a reference for measurement and generate a beat signal. A frequency of laser output light is modulated, but, apart from this, the laser output light is accompanied by fluctuations due to phase noise generated by the laser itself. Thus, the beat signal contains a mixture of a component caused by frequency modulation and a component caused by phase noise. As the distance to the object increases, a time delay (delay time) of the scattered light with respect to the reference light increases and the component caused by the phase noise becomes relatively large as compared with the component caused by frequency modulation. Thus, a signal-to-noise ratio of the beat signal is lowered and therefore deterioration of measurement accuracy occurs.

The coherence length is one of standard measures for the maximum measurement distance. The coherence length is defined as the distance at which a value of a coherence function of the laser output light is 1/e. The coherence length of a general semiconductor laser for optical communication is 100 m or less. In FMCW LiDAR, the maximum measurement distance is limited to 50 m or less because light to be measured reciprocates the distance to the object. By using an external resonator semiconductor laser with high spectral purity or a fiber laser, the maximum measurement distance can be expanded to 100 m or more, but the size of the laser device becomes large and the frequency modulation function is limited.

In the method of Non-Patent Literature 1, an additional interferometer other than that for sensing is provided. Then, the non-linear chirp and the phase noise of the laser are detected by the additional interferometer. The detected non-linear chirp and the phase noise are returned to the laser or the modulator, and the frequency is controlled. Although this method is a method of simultaneously achieving the decrease in the non-linear chirp and the increase in the coherence length, it is necessary to provide the monitoring interferometer and a control circuit and the performance of phase noise reduction is limited by a control bandwidth.

In the method of Patent Literature 3, a laser frequency is measured using an additional interferometer other than that for sensing, and the influence of a calculation process for the beat signal including the influence of phase noise is reduced. Although this method enables measurement exceeding the coherence length of the laser, it is not suitable for real-time processing because the monitoring interferometer is required to be provided and a complicated calculation process is required.

The inventor of the present invention filed patent applications related to: a device and a method using a heterodyne optical system and an arithmetic processing unit (Japanese Patent Application No. 2018-222416); and a device and a method using a homodyne optical system and an arithmetic processing unit (Japanese Patent Application No. 2019-118793), for the purpose of eliminating the influence of the non-linear chirp and enabling accurate distance and speed measurement. Because the phase noise of the laser is not taken into consideration in the methods of these applications, the accuracy deterioration due to the phase noise of the laser occurs as in FMCW LiDAR of the prior art. In order to reduce the influence of the phase noise, a countermeasure for increasing the chirp bandwidth or a countermeasure using a low noise laser can be considered. However, in the former case, a wideband detection/processing circuit is required as the beat frequency increases. In the latter case, the laser device is expensive and the frequency modulation function is limited.

As described above, in the prior art, the additional monitoring interferometer and/or a control circuit are required to the interferometer for sensing, which complicates the device configuration. In the method using negative feedback control, the noise reduction performance is limited by the control bandwidth. The method using a complicated calculation process is not suitable for FMCW LiDAR which requires real-time processing. If, as a device for measuring an optical distance, speed, or both of them, a small and low cost system were realized with ability to completely eliminate the phase noise and without complicating the device configuration, it would be utilized in the consumer field such as in-vehicle sensors for automated driving and robot home appliances.

The present invention has been made to solve the above-described problems and an objective of the present invention is to provide an optical measurement device and a method that are not subject to measurement distance limitation due to coherence of a laser. Also, an objective of the present invention is to provide an optical measurement device and a method capable of completely eliminating the phase noise of a laser and enabling accurate measurement of at least one of distance and speed without using negative feedback control or complicated calculation processing.

Solution to Problem

The present invention has the following features for achieving the above-described objective.

(1) An optical measurement device including: a multi-frequency laser configured to simultaneously generate a frequency-fixed carrier and at least one frequency-modulated subcarrier, either the carrier or the subcarrier within output light of the multi-frequency laser being used as first measurement light, either the carrier or the subcarrier having a frequency different from that of the first measurement light being used as second measurement light; an optical branching element configured to divide the output light of the multi-frequency laser into two parts, one of the two parts being a reference light, and other of the two parts being a probe light; an optical system configured to apply the probe light to an object and output scattered light from the object as a signal light; a dual frequency beat signal generator configured to input the reference light and the signal light and separate and output a first complex beat signal derived from the first measurement light and a second complex beat signal derived from the second measurement light; a difference signal generator configured to output a difference signal between the first complex beat signal and the second complex beat signal; and an arithmetic processing unit configured to execute at least one of an arithmetic process of calculating a speed of the object from the difference signal and an arithmetic process of calculating a distance to the object from the difference signal.

(2) The optical measurement device according to the above-described (1), wherein the difference signal is either a phase difference signal between the first complex beat signal and the second complex beat signal or a difference frequency signal that is a beat signal generated by mixing the first complex beat signal with the second complex beat signal.

(3) The optical measurement device according to the above-described (1) or (2), wherein the multi-frequency laser includes: a single frequency laser; an optical modulator; a modulation signal generator that is a signal source for applying frequency modulation to the subcarrier; and a subcarrier generation signal generator configured to drive the optical modulator and generate the subcarrier for output light of the single frequency laser.

(4) The optical measurement device according to the above-described (1) or (2), wherein the multi-frequency laser includes: a semiconductor laser; a modulation signal generator that is a signal source for applying frequency modulation to the subcarrier; and a subcarrier generation signal generator configured to modulate an output of the semiconductor laser.

(5) The optical measurement device according to any one of the above-described (1) to (4), wherein the dual frequency beat signal generator has a configuration of a heterodyne interferometer. For example, the dual frequency beat signal generator includes an optical frequency shifter configured to apply a frequency shift to the reference light, an optical coupling element configured to combine the signal light with the frequency-shifted reference light, a first light demultiplexer configured to separate an output of the optical coupling element, a first photodetector configured to optically receive the component derived from the first measurement light separated and output by the first light demultiplexer and output the first complex beat signal, and a second photodetector configured to optically receive the component derived from the second measurement light separated and output by the first light demultiplexer and output the second complex beat signal. Also, the optical frequency shifter may be applied to the probe light or the signal light instead of the reference light.

(6) The optical measurement device according to any one of the above-described (1) to (4), wherein the dual frequency beat signal generator has a configuration of a homodyne interferometer including a phase diversity detector. For example, the dual frequency beat signal generator includes a second light demultiplexer configured to input the reference light and separate the component derived from the first measurement light and the component derived from the second measurement light, a third light demultiplexer configured to input the signal light and separate the component derived from the first measurement light and the component derived from the second measurement light, a first phase diversity detector configured to input the component derived from the first measurement light separated by the second light demultiplexer and the component derived from the first measurement light separated by the third light demultiplexer and output the first complex beat signal, and a second phase diversity detector configured to input the component derived from the second measurement light separated by the second light demultiplexer and the component derived from the second measurement light separated by the third light demultiplexer and output the second complex beat signal.

(7) The optical measurement device according to any one of the above-described (1) to (6), wherein the difference signal generator includes: a first phase demodulator configured to input the first complex beat signal and demodulate a phase thereof; a second phase demodulator configured to input the second complex beat signal and demodulate a phase thereof; and a subtractor configured to output a phase difference signal between the first and second complex beat signals as the difference signal. When the difference signal generator of the above-described (7) is used, it is desirable that the frequency modulation be associated with a sine wave and it is desirable that the output of the modulation signal generator of the above-described (3) and (4) be a sine wave.

(8) The optical measurement device according to any one of the above-described (1) to (6), wherein the difference signal generator includes: a frequency mixer configured to perform a multiplication process for the first complex beat signal and the second complex beat signal and output a sum frequency signal and a difference frequency signal of both signals; and a low pass filter configured to eliminate the sum frequency signal and output the difference frequency signal as the difference signal. When the difference signal generator of the above-described (8) is used, it is desirable that the frequency modulation be associated with a triangular wave or a sawtooth wave and it is desirable that the output of the modulation signal generator of the above-described (3) and (4) be a triangular wave or a sawtooth wave.

(9) An optical measurement method including the steps of: dividing light of a multi-frequency laser configured to simultaneously generate a frequency-fixed carrier and at least one frequency-modulated subcarrier into two parts, defining one of the two parts as reference light, and defining other of the two parts as probe light; applying the probe light to an object and defining a scattered light from the object as a signal light; defining either the carrier or the subcarrier of an output light of the multi-frequency laser as a first measurement light, and defining either the carrier or the subcarrier having a frequency different from that of the first measurement light as a second measurement light; inputting the signal light and the reference light and generating a first complex beat signal and a second complex beat signal between the signal light and the reference light with respect to the first measurement light and the second measurement light;

generating a difference signal between the first complex beat signal derived from the first measurement light and the second complex beat signal derived from the second measurement light; and obtaining at least one of a speed of the object and a distance to the object from the difference signal.

(10) The optical measurement method according to the above-described (9), wherein the difference signal is either a phase difference signal between the first complex beat signal and the second complex beat signal or a difference frequency signal that is a beat signal generated by mixing the first complex beat signal with the second complex beat signal.

(11) The optical measurement method according to the above-described (9) or (10), wherein the first complex beat signal and the second complex beat signal are generated using a configuration of either a heterodyne interferometer or a homodyne interferometer.

(12) The optical measurement method according to any one of the above-described (9) to (11), wherein a phase difference signal that is the difference signal is time-differentiated and converted into a frequency difference signal, a Doppler shift is calculated using an average value of the frequency difference signal, and the speed is obtained using the Doppler shift.

(13) The optical measurement method according to any one of the above-described (9) to (11), wherein a phase difference signal that is the difference signal is time-differentiated and converted into a frequency difference signal, a Doppler shift is obtained using an average value of the frequency difference signal, an average value of absolute values after a component of the Doppler shift is eliminated from the phase difference signal is obtained, and a distance to the object is calculated on the basis of a constant of proportionality of distance calculation obtained in advance.

(14) The optical measurement method according to any one of the above-described (9) to (11), wherein at least one of an arithmetic process of calculating a speed of the object from a frequency spectrum of a difference frequency signal that is the difference signal and an arithmetic process of calculating a distance to the object from the frequency spectrum of the difference frequency signal that is the difference signal is executed. For example, the arithmetic processing unit calculates the spectrum of the difference frequency signal, obtains a peak frequency caused by scattering from the object, and calculates a distance to the object and a speed of the object from the peak frequency.

(15) The optical measurement method according to any one of the above-described (9) to (14), wherein frequency modulation is associated with any one of a sine wave, a triangular wave, and a sawtooth wave. When a phase difference signal is used as the difference signal, it is desirable that the frequency modulation be associated with a sine wave. When a difference frequency signal is used as the difference signal, it is desirable that the frequency modulation be associated with either a triangular wave or a sawtooth wave.

Advantageous Effects of Invention

In the optical measurement device and a method of the present invention, because two waves of a multi-frequency laser having at least one wave that has been frequency-modulated are used to generate a difference signal between two complex beat signals, a component caused by phase noise of the laser can be completely eliminated from a beat signal in FMCW LiDAR. Also, components caused by frequency modulation and a Doppler shift can be selectively detected. As a result, a distance and a speed can be measured with high accuracy.

Also, in the present invention, because a maximum measurement distance is not limited by a coherence length of a laser, the measurement accuracy does not depend on the distance and accurate measurement is possible even at a long distance. Also, there is a significantly small variation in measurement regardless of a long or short distance.

Also, in the present invention, a large laser with high spectral purity is not required and a small device that does not require high-performance parts can be implemented.

Also, because the phase noise of the laser can be eliminated, a large chirp bandwidth is not required. Therefore, when the distance and the speed are obtained using the phase difference signal as the difference signal, the required signal processing band can be reduced by one or more orders of magnitude.

BRIEF DESCRIPTION OF DRAWINGS

FIG. 3 is a diagram for describing an example of a multi-frequency laser, wherein FIG. 3(a) is a diagram for describing a first example and FIG. 3(b) is a diagram for describing a second example.

FIG. 11 is a diagram showing an example of results of measuring phases of a carrier and a subcarrier and a phase difference signal according to the first embodiment, wherein FIG. 11(a) shows a result for a delayed optical fiber of 10 m, FIG. 11(b) shows a result for a delayed optical fiber of 120 m, and FIG. 11(c) shows a result for a delayed optical fiber of 1 km.

FIG. 12 is a diagram showing a distribution of measured distance values in 16 measurement processes according to the first embodiment, wherein FIG. 12(a) is a result for a delayed optical fiber of 10 m, FIG. 12(b) is a result for a delayed optical fiber of 120 m, and FIG. 12(c) is a result for a delayed optical fiber of 1 km.

FIG. 17 is a diagram according to the second embodiment, wherein FIG. 17(a) is a diagram showing a spectrum of a second complex beat signal and FIG. 17(b) is a diagram showing a spectrum of a difference frequency signal.

DESCRIPTION OF EMBODIMENTS

Hereinafter, embodiments of the present invention will be described in detail. In the embodiment of the present invention, at least one of a distance to an object and a speed of the object is measured using a device including at least a multi-frequency laser, an optical system such as an optical branching element, an optical coupling element, or an optical circulator, a transmission/reception optics, a dual frequency beat signal generator, a difference signal generator, and an arithmetic processing unit. Here, the speed of the object is a relative speed at which a direction in which the object moves away is positive when viewed from an optical measurement device of the present invention. The dual frequency beat signal generator has a configuration in which first and second complex beat signals derived from two different frequencies are generated.

Figure 1:
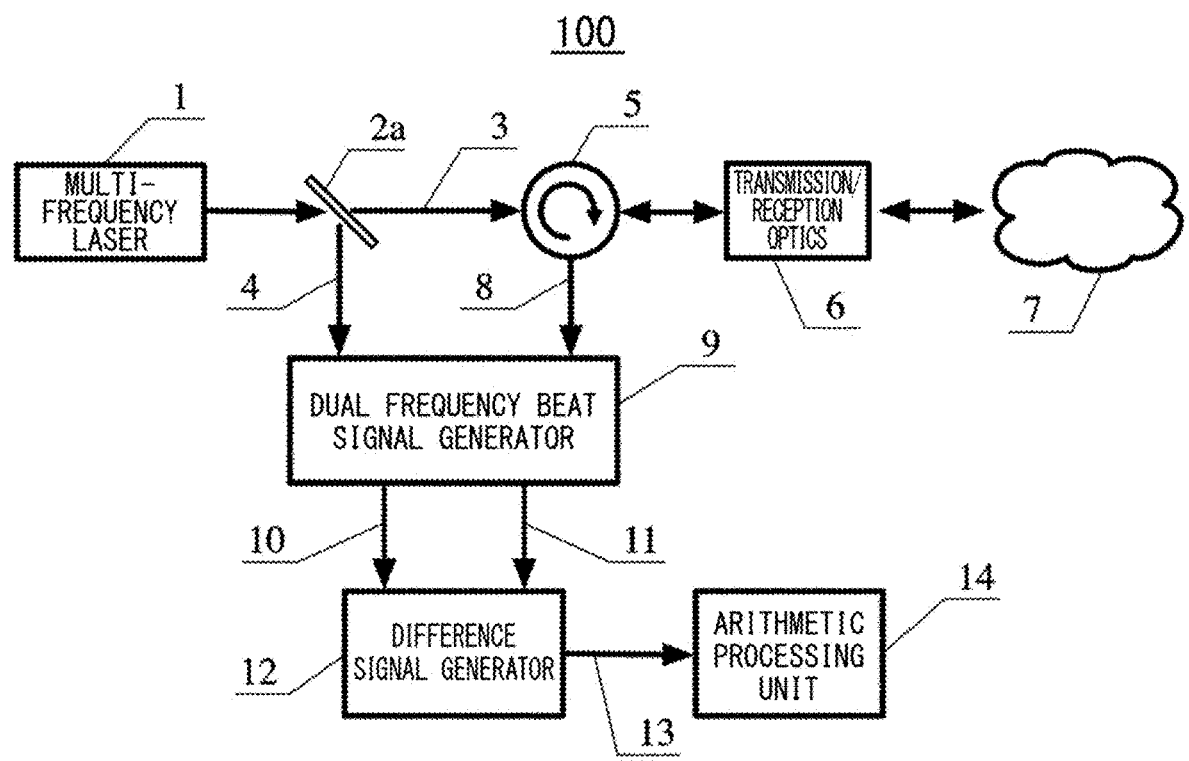
FIG. 1 is a diagram for describing a basic configuration of an optical measurement device according to the present invention.

FIG. 1 is a diagram for describing a basic configuration of an optical measurement device 100 according to an embodiment of the present invention. The optical measurement device of FIG. 1 includes a multi-frequency laser 1, a beam splitter 2a serving as the optical branching element, an optical circulator 5, a transmission/reception optics 6, a dual frequency beat signal generator 9, a difference signal generator 12, and an arithmetic processing unit 14. The multi-frequency laser 1 simultaneously generates a frequency-fixed carrier and at least one frequency-modulated subcarrier. Either the carrier or the subcarrier within the output light of the multi-frequency laser is used as first measurement light and either the carrier or the subcarrier having a frequency different from that of the first measurement light is used as second measurement light.

Figure 2:
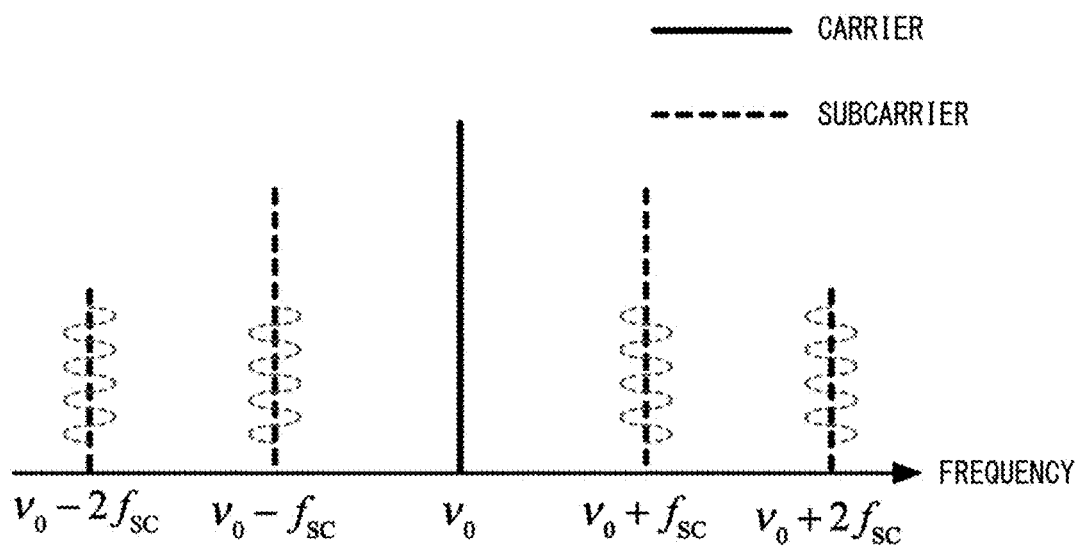
FIG. 2 is a diagram for describing a spectrum of output light of a multi-frequency laser.

FIG. 2 is a diagram for describing a spectrum of the output light of the multi-frequency laser 1. The output light of the multi-frequency laser 1 includes a frequency-fixed carrier having a center frequency of $v_0$ and a frequency-modulated subcarrier having a center frequency of $v_0 \pm nf_{SC}$ (n is a positive integer). For convenience, FIG. 2 shows subcarriers having center frequencies up to $v_0 \pm 2f_{SC}$. It is assumed that phase synchronization between the subcarrier and the carrier is achieved and the subcarrier has the same phase noise as the carrier. In the embodiment of the present invention, a combination of a frequency-fixed carrier and one frequency-modulated subcarrier or two frequency-modulated subcarriers are used.

FIGS. 3(a) and 3(b) are diagrams for describing an example of the multi-frequency laser 1. FIG. 3(a) is a diagram for describing a first example and includes a single frequency laser 15, an optical modulator 16, a modulation signal generator 17, and a subcarrier generation signal generator 18. The modulation signal generator 17 is a signal source that applies frequency modulation to the subcarrier. The subcarrier generation signal generator 18 drives the optical modulator 16 to generate the subcarrier for the output light of the single frequency laser 15. The frequency of the subcarrier generation signal generator 18 is set to be suitable for the characteristics of the dual frequency beat signal generator 9 to be described below and has a frequency modulation function due to an external input signal. As the optical modulator 16, any optical modulator such as an intensity modulator or a phase modulator can be used as long as it generates modulation sidebands. From the viewpoint of light utilization efficiency, a single sideband modulator that generates only one carrier and one subcarrier is desirable.

Figure 3:
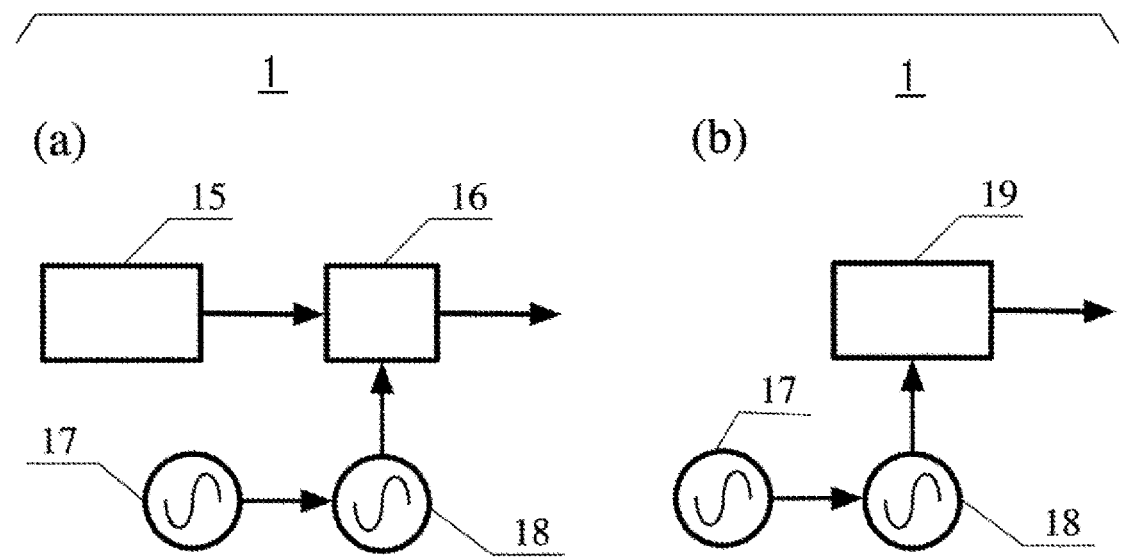

FIG. 3(*b*) is a diagram for describing a second example of the multi-frequency laser 1 and includes a semiconductor laser 19, a modulation signal generator 17, and a subcarrier generation signal generator 18. Operations of the modulation signal generator 17 and the subcarrier generation signal generator 18 are similar to those of the case of the first example. The semiconductor laser 19 is, for example, a DFB laser or a semiconductor laser in which a modulator is integrated. An output of the subcarrier generation signal generator 18 is input to an injection current of the DFB laser or the modulator within the semiconductor laser to generate a subcarrier.

In the multi-frequency laser 1, because a carrier is modulated to generate a subcarrier, the subcarrier and the carrier have in-phase phase noise. Further, a phase change associated with the frequency modulation and the phase noise of the subcarrier generation signal generator 18 are added to the subcarrier. Also, as shown in FIG. 2, with respect to a frequency-fixed carrier, the phase change due to the frequency modulation is a difference in phase of 180 degrees between the subcarrier on a high-frequency side and the subcarrier on a low-frequency side. It is preferable that the carrier frequency $v_0$ and the subcarrier frequency $v_0 \pm nf_{SC}$ be optically separated. Also, it is preferable that $f_{SC}$ be in a range in which the direct modulation of the modulator or the laser can respond. $f_{SC}$ and $v_0$ can be arbitrarily selected and there are no particular restrictions in principle. In reality, they are limited by the specifications of available parts. For example, a minimum value of $f_{SC}$ is a frequency difference (about 1 GHz) that can be separated by an optical filter. Also, for example, a maximum value of $f_{SC}$ largely depends on the modulation performance and is about 100 GHz. Also, the carrier frequency $v_0$ can be used at all frequencies in which there is a single frequency laser. For example, all of an ultraviolet region, a visible region, and an infrared region are possible.

An optical measurement method using the basic configuration of the optical measurement device according to the embodiment of the present invention will be described with reference to FIG. 1.

The output light of the multi-frequency laser 1 is divided into two parts by the beam splitter 2*a*, wherein one of the two parts is used as reference light 4 and the other of the two parts is used as probe light 3. The probe light 3 is irradiated to the object 7 via the optical circulator 5 and the transmission/reception optics 6 and the scattered light from the object 7 is output as a signal light 8 from the optical circulator 5. The reference light 4 and the signal light 8 are input to the dual frequency beat signal generator 9 and the first complex beat signal 10 derived from the first measurement light and the second complex beat signal 11 derived from the second measurement light are output.

The first complex beat signal 10 and the second complex beat signal 11 are input to the difference signal generator 12 and either the phase difference signal or the difference frequency signal is output as a difference signal 13. The phase difference signal is a signal corresponding to an instantaneous phase difference obtained by demodulating two complex beat signals. The difference frequency signal is a beat signal generated by mixing the two complex beat signals. Generally, when an electrical signal having a difference frequency is generated from two types of light having different frequencies, it is referred to as a beat signal. In the present invention, because an electrical signal having a difference frequency is generated from two electrical signals having different frequencies, this can also be referred to as a "beat signal," but is referred to as a "difference frequency signal" for distinguishing from a complex beat signal or the like output from the dual frequency beat signal generator. It is also referred to as a "secondary beat signal."

In the difference signal 13, the phase noise of the multi-frequency laser 1 is canceled out.

The difference signal 13 output from the difference signal generator 12 is input to the arithmetic processing unit 14 and at least one of an arithmetic process of calculating the speed of the object 7 and an arithmetic process of calculating the distance to the object 7 is executed.

When the phase difference signal is output as the difference signal 13, the phase difference signal is time-differentiated to obtain a frequency difference between the two complex beat signals, the Doppler shift is calculated from an average value of frequency differences during one modulation cycle for the subcarrier, and the speed of the object 7 is obtained. Next, after a component of the Doppler shift is eliminated from the phase difference signal, an average value of absolute values during one modulation cycle for the subcarrier (hereinafter referred to as an "absolute average phase") is calculated. Furthermore, the distance to the object is calculated using a relational expression between the distance calibrated in advance and the absolute average phase.

When the difference frequency signal is output as the difference signal 13, a spectrum of the difference frequency signal is calculated to obtain a peak frequency caused by a scattering of light from the object and the speed of the object and the distance to the object are calculated from the peak frequency. The method of calculating the speed and the distance is similar to that of FMCW LiDAR of the prior art.

Next, a case where a frequency-fixed carrier is used as the first measurement light and a frequency-modulated subcarrier is used as the second measurement light will be mainly described. Also, even if all frequency-modulated subcarriers are used as the first and second measurement light, the measurement can be performed in a similar way.

The phase of the first complex beat signal 10 includes the phase noise of the carrier and the Doppler shift caused by the motion of the object 7. On the other hand, the phase of the second complex beat signal 11 includes the phase noise of the subcarrier, the Doppler shift caused by the motion of the object 7, the phase change due to frequency modulation, and the phase noise of the subcarrier generation signal generator 18. In the difference signal 13, the phase noise of the first and second measurement light is canceled out and the phase change due to the frequency modulation of the subcarrier, the Doppler shift corresponding to the frequency difference between the first and second measurement light, and the phase noise of the subcarrier generation signal generator 18 remain. Therefore, the phase noise of the multi-frequency laser 1 can be completely eliminated. Even if all subcarriers are used as the first and second measurement light, the phase noise of the multi-frequency laser 1 is canceled out.

Figure 4:
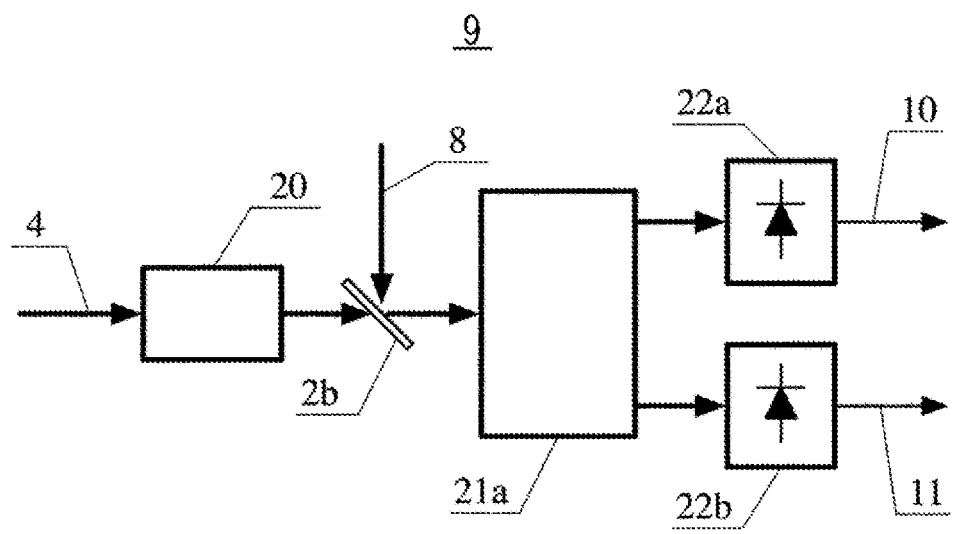
FIG. 4 is a diagram for describing a first example of a dual frequency beat signal generator.

FIG. 4 is a diagram for describing a first example of the dual frequency beat signal generator 9. The dual frequency beat signal generator 9 of the first example has a heterodyne interferometer configuration, and includes an optical frequency shifter 20, a light demultiplexer 21*a*, and photodetectors 22*a* and 22*b*. After the reference light 4 is frequency-shifted by the optical frequency shifter 20, the reference light 4 whose frequency has been shifted is combined with the signal light 8 by the beam splitter 2*b* serving as the optical coupling element and input to the light demultiplexer 21*a*. The light demultiplexer 21*a* separates and outputs a component derived from the first measurement light and a component derived from the second measurement light. The separated components are optically received using the photodetectors 22*a* and 22*b* and each of the first complex beat signal 10 and the second complex beat signal 11 is output.

Figure 5:
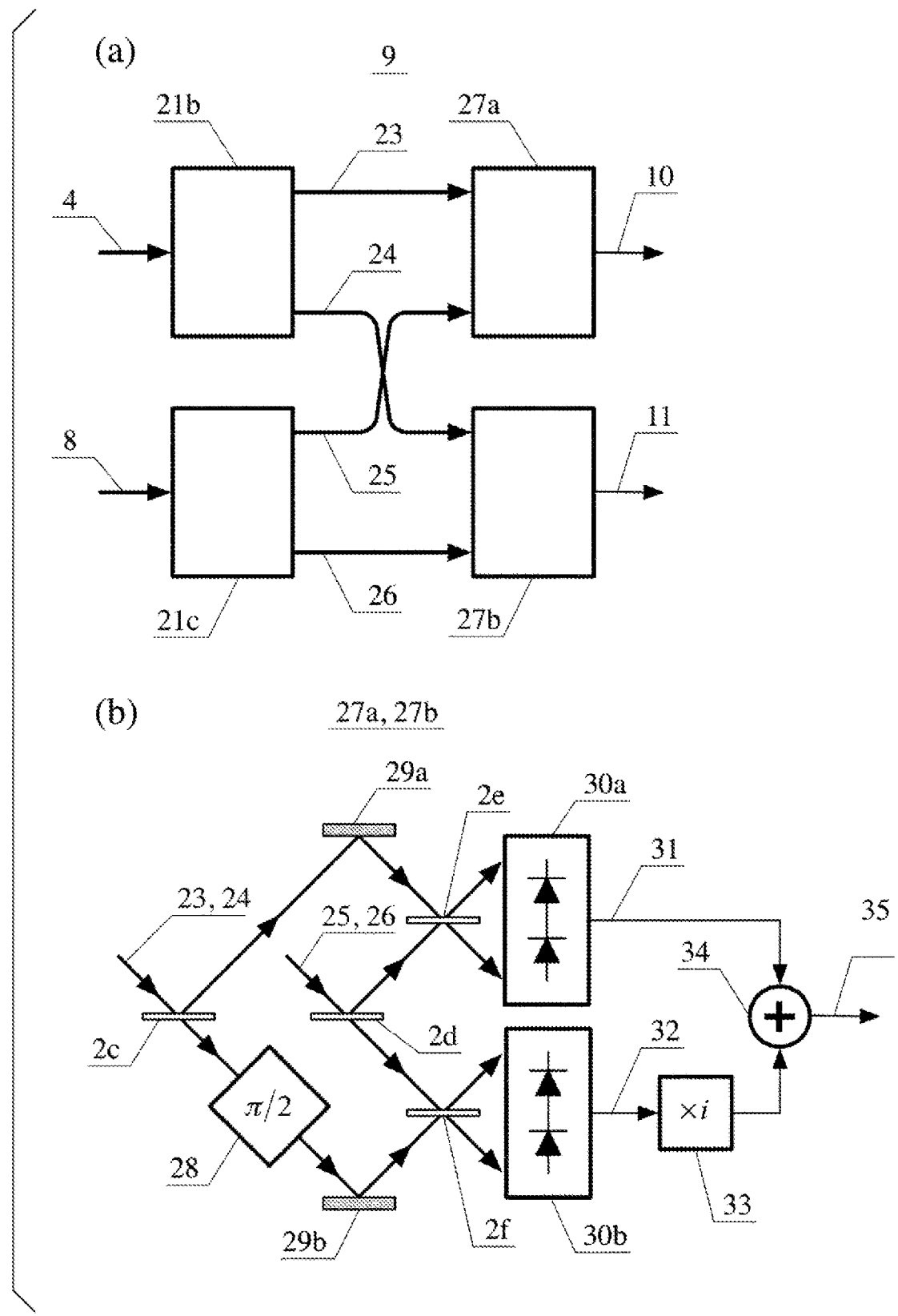
FIG. 5(a) is a diagram for describing a second example of the dual frequency beat signal generator.
FIG. 5(b) is a diagram for describing a phase diversity detector of FIG. 5(a).

FIG. 5(*a*) is a diagram for describing a second example of the dual frequency beat signal generator 9. The dual frequency beat signal generator 9 of the second example has a configuration of a homodyne interferometer and includes light demultiplexers 21*b* and 21*c* and phase diversity detectors 27*a* and 27*b*. The reference light 4 is input to the light demultiplexer 21*b*, the signal light 8 is input to the light demultiplexer 21*c*, and the component of the first measurement light and the component of the second measurement light are separated and output. Reference light 23 derived from the first measurement light output from the light demultiplexer 21*b* and signal light 25 derived from the first measurement light output from the light demultiplexer 21*c* are input to the phase diversity detector 27*a* and the first complex beat signal 10 is output. Likewise, reference light 24 derived from the second measurement light output from the light demultiplexer 21*b* and signal light 26 derived from the second measurement light output from the light demultiplexer 21*c* are input to the phase diversity detector 27*b* and the second complex beat signal 11 is output.

FIG. 5(*b*) is a diagram for describing the phase diversity detectors 27*a* and 27*b*. The phase diversity detectors 27*a* and 27*b* include beam splitters 2*c*, 2*d*, 2*e*, and 2*f*, a π/2 phase shifter 28, total internal reflection mirrors 29*a* and 29*b*, and balanced photodetectors 30*a* and 30*b*. The reference light (the reference light 23 derived from the first measurement light and the reference light 24 derived from the second measurement light) is divided into two parts by the beam splitter 2*c*, wherein one of the two parts is guided to the balanced photodetector 30*a* via the total internal reflection mirror 29*a* and the beam splitter 2*e*. The other of the two parts is guided to the balanced photodetector 30*b* via the π/2 phase shifter 28, the total internal reflection mirror 29*b*, and the beam splitter 2*f*. The signal light (the signal light 25 derived from the first measurement light and the signal light 26 derived from the second measurement light) is divided into two parts by the beam splitter 2*d*, wherein one of the two parts is guided to the balanced photodetector 30*a* via the beam splitter 2*e*. The other of the two parts is guided to the balanced photodetector 30*b* via the beam splitter 2*f*. A in-phase component 31 of the complex beat signal is output from the balanced photodetector 30*a* and an quadrature component 32 of the complex beat signal is output from the balanced photodetector 30*b*. The quadrature component 32 is input to an imaginary unit multiplier 33 to form an imaginary part and an adder 34 adds the in-phase component 31 of a real part to the imaginary part to generate a complex beat signal 35.

Figure 6:
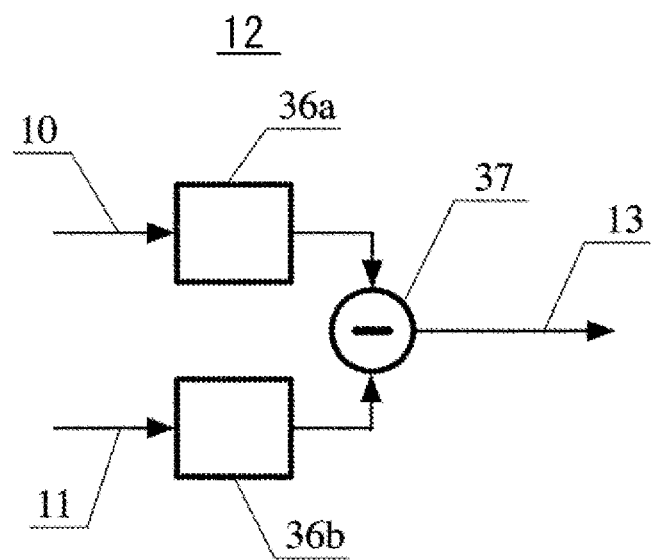
FIG. 6 is a diagram for describing a first example of a difference signal generator 12.

FIG. 6 is a diagram for describing a first example of the difference signal generator 12. The difference signal generator 12 of the first example includes phase demodulators 36*a* and 36*b* and a subtractor 37. The first complex beat signal 10 is input to the phase demodulator 36*a* and the second complex beat signal 11 is input to the phase demodulator 36*b*. After phases are demodulated and phase-demodulated signals are input to the subtractor 37, a phase difference signal between the first complex beat signal 10 and the second complex beat signal 11 is output as the difference signal 13.

Figure 7:
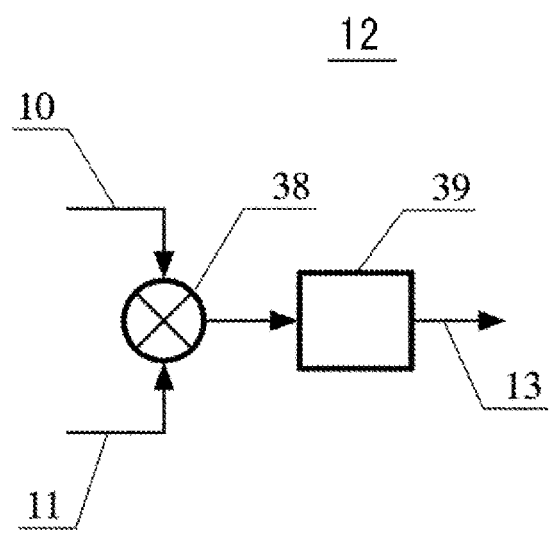
FIG. 7 is a diagram for describing a second example of the difference signal generator 12.

FIG. 7 is a diagram for describing a second example of the difference signal generator 12. The difference signal generator 12 of the second example includes a frequency mixer 38 and a low pass filter 39. The first complex beat signal 10 and the second complex beat signal 11 are input to the frequency mixer 38. The frequency mixer 38 has a function of performing a multiplication process for two input signals and outputting a sum frequency signal and a difference frequency signal of both signals. An output of the frequency mixer 38 is input to the low pass filter 39, the sum frequency signal is eliminated, and the difference frequency signal between the two complex beat signals is output as the difference signal 13.

First Embodiment

In the present embodiment, a case where a speed and a distance are calculated in an arithmetic process in a time domain using the phase difference signal between the first and second complex beat signals as the difference signal will be described. In the present embodiment, description will be given using an example in which the dual frequency beat signal generator 9 (see FIG. 4 or FIG. 5(*a*)) and the first example of the difference signal generator 12 (see FIG. 6) are used in the optical measurement device of FIG. 1.

Figure 8:
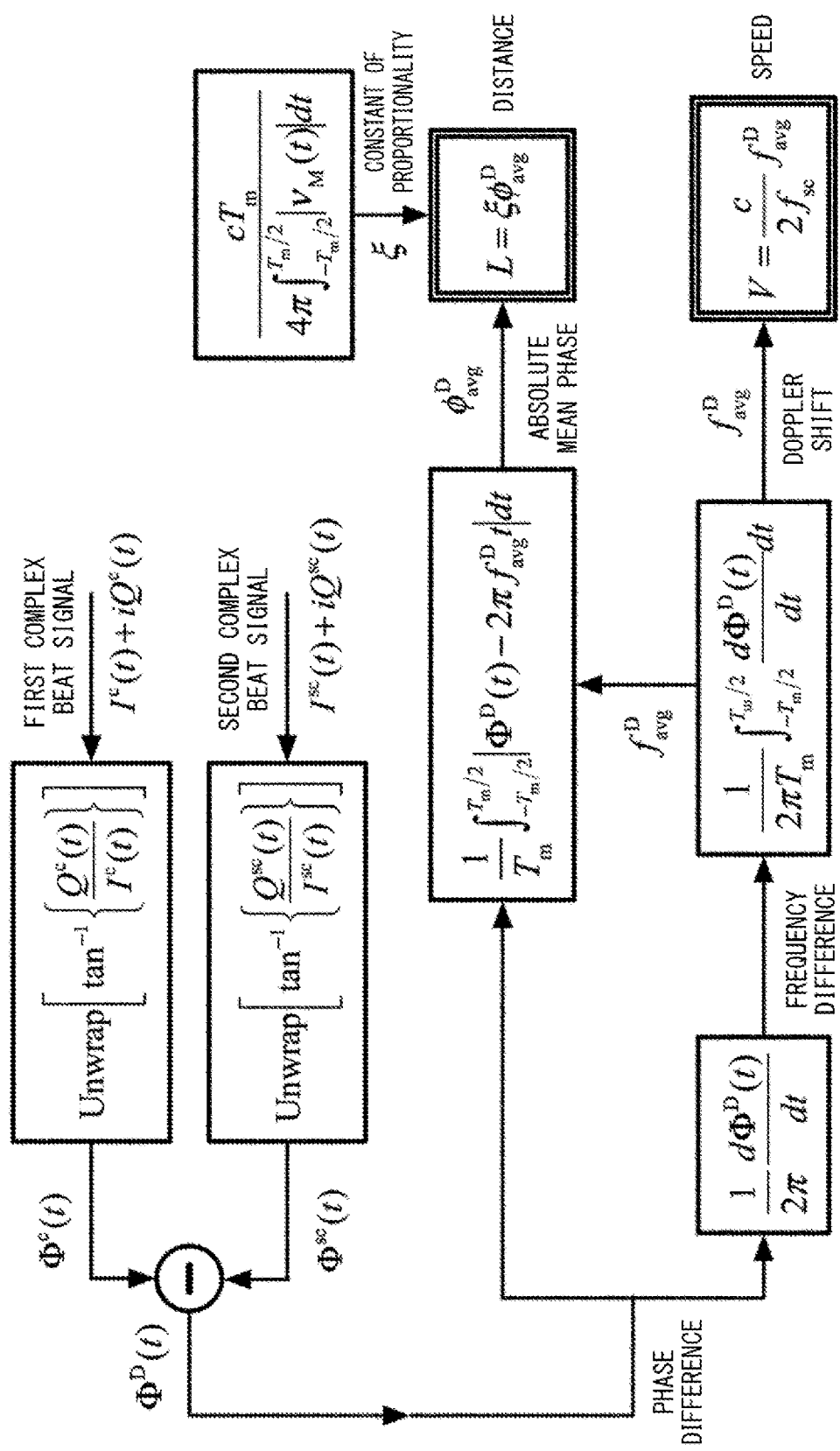
FIG. 8 is a diagram for describing a process of calculating a speed of an object and a distance to the object from first and second complex beat signals.

FIG. 8 is a diagram for describing a process of calculating the speed of the object 7 and the distance to the object 7 from the first and second complex beat signals using a phase difference and a frequency difference between the two complex beat signals.

Hereinafter, detailed description will be given using a mathematical formula with reference to FIG. 8. In the following description, a frequency-fixed carrier is used as the first measurement light and a frequency-modulated subcarrier is used as the second measurement light. The symbol of the superscript "c" denotes a physical quantity for a carrier and the symbol of the superscript "sc" denotes a physical quantity for a subcarrier.

Initially, a process of obtaining a phase from a complex beat signal in the phase demodulators 36*a* and 36*b* constituting a part of the first example of the difference signal generator 12 of FIG. 6 will be described. The complex beat signal for the carrier and the subcarrier is expressed by the following equation.

[Math. 1]

$$V_B^n(t) = I^n(t) + i Q^n(t), \quad n = c, sc \tag{1}$$

Here, $I^n(t)$ is a in-phase component of the complex beat signal and $Q^n(t)$ is an quadrature component.

Eq. (1) is a complex representation of the beat signal and a sum of the in-phase component $I^n(t)$ that is a real part and the quadrature component $Q^n(t)$ that is an imaginary part is output in the second example of the dual frequency beat signal generator 9. On the other hand, in the first example of the dual frequency beat signal generator 9, the complex beat signal expressed by the following equation is output.

[Math. 2]

$$V_B{}^n(t) = I^n(t)\cos(2\pi f_S t) + Q^n(t)\sin(2\pi f_S t), \quad n=c,sc \quad (2)$$

Here, $f_S$ denotes a frequency based on a frequency shift applied by the optical frequency shifter 18. A process of mixing the complex beat signal expressed by Eq. (2) with a local oscillator signal of the frequency $f_S$ is performed and therefore the in-phase component $I^n(t)$ and the quadrature component $Q^n(t)$ can be separated and detected.

The in-phase component and the quadrature component for the carrier and the subcarrier can be expressed by the following equations.

[Math. 3]

$$I^n(t) = A^n\{1 + \alpha^n(t)\}\cos \Phi^n(t)$$

$$Q^n(t) = A^n\{1 + \alpha^n(t)\}\sin \Phi^n(t), \quad n=c,sc \quad (3)$$

Here, $A^n$ denotes a net amplitude, $\alpha^n(t)$ denotes a value of amplitude modulation, and $\Phi^n(t)$ denotes a phase.

From the in-phase component and the quadrature component expressed by Eqs. (3), phases $\Phi^n(t)$ for the carrier and the subcarrier can be obtained using the following equation.

[Math. 4]

$$\Phi^n(t) = \text{Unwrap}\left[\tan^{-1}\left\{\frac{Q^n(t)}{I^n(t)}\right\}\right], \quad n=c,sc \quad (4)$$

Here, Unwrap denotes a phase unwrap process. Because the inverse tangent in Eq. (4) calculates a value in the range of $-\pi$ to $+\pi$, a phase exceeding $\pm\pi$ is a value from which an integer multiple of $\pm\pi$ is subtracted. In the unwrap process, the phase subtracted from a discontinuity point of the phase change is detected and corrected and a true phase is obtained.

Next, the elimination of phase noise in the phase difference signal will be described. The phase $\Phi^c(t)$ of the complex beat signal generated from the carrier can be expressed by the following equation.

[Math. 5]

$$\Phi^c(t) = \phi_N(t) + \phi_D^c(t) + 2\pi v_0 \tau_d \quad (5)$$

$$= \{\theta_N(t) - \theta_N(t - \tau_d)\} + \frac{4\pi v_0 V}{c}t + 2\pi v_0 \tau_d$$

Here, the first term represents a component caused by the phase noise of the multi-frequency laser 1, the second term represents a component caused by the Doppler shift, the third term represents the phase offset, $\theta_N(t)$ denotes phase noise of the multi-frequency laser 1, $\tau_d$ denotes the round-trip time of light to the object 7, $v_0$ denotes a carrier frequency, V denotes a relative speed associated with the object 7, and c denotes a speed of light.

The phase $\Phi^{sc}(t)$ of the complex beat signal generated from the subcarrier can be expressed by the following equation.

[Math. 6]

$$\Phi^{sc}(t) = \phi_N(t) + \phi_D^{sc}(t) + \phi_M(t) + \phi_{RF}(t) + 2\pi(v_0 + f_{sc})\tau_d \quad (6)$$

$$= \{\theta_N(t) - \theta_N(t - \tau_d)\} + \frac{4\pi(v_0 + f_{sc})V}{c}t + \phi_M(t) +$$

$$\{\theta_{RF}(t) - \theta_{RF}(t - \tau_d)\} + 2\pi(v_0 + f_{sc})\tau$$

Here, the first term represents a component caused by the phase noise of the multi-frequency laser 1, the second term represents a component caused by the Doppler shift, the third term represents a component caused by the frequency modulation of the subcarrier, the fourth term represents a component caused by the phase noise of the subcarrier generation signal generator 18, and the fifth term represents a phase offset. The subcarrier whose center frequency is $v_0 + f_{SC}$ is described. $f_{sc}$ and $\theta_{RF}(t)$ denote a frequency and the phase noise of the subcarrier generation signal generator 18, respectively.

From Eqs. (5) and (6), the phase difference signal $\Phi^D(t)$ can be obtained as in the following equation.

[Math. 7]

$$\Phi^D(t) = \Phi^{sc}(t) - \Phi^c(t) = \quad (7)$$

$$\frac{4\pi f_{sc} V}{c}t + \phi_M(t) + \{\theta_{RF}(t) - \theta_{RF}(t - \tau_d)\} + 2\pi f_{sc}\tau_d + \phi_{NF}(t)$$

The first term of the phase difference signal represents a component caused by the Doppler shift, the second term represents a component caused by the frequency modulation of the subcarrier, the third term represents a component caused by the phase noise of the subcarrier generation signal generator 18, and the fourth term represents a phase offset. The fifth term $\phi_{NF}(t)$ represents background noise and depends on shot noise and noise of the photodetectors 22a and 22b (parts of the first example of the dual frequency beat signal generator) or the balanced photodetectors 30a and 30b (parts of the phase diversity detector constituting the second example of the dual frequency beat signal generator). The shot noise is the quantum mechanical fluctuation of coherent light, and is ultimate noise that cannot be eliminated as long as laser light is used. In the phase difference signal, the component caused by the phase noise of the multi-frequency laser 1 is completely eliminated. The phase offset of the fourth term is a direct current (DC) component and can be eliminated by subtracting an average value during one modulation cycle of the phase difference signal.

Next, the process of calculating the distance to the object 7 and the speed of the object 7 from the phase difference signal $\Phi^D(t)$ represented by Eq. (7) will be described.

Here, for ease of description, a case where the component caused by the phase noise of the subcarrier generation signal generator 18 of the third term of Eq. (7) and the background noise of the fifth term are excluded is considered. The second term of Eq. (7) can be expressed by the following equation.

[Math. 8]

$$\phi_M(t) = 2\pi \int_0^t \{v_M(t') - v_M(t' - \tau_d)\} dt' \quad (8)$$

Here, $v_M(t)$ denotes the frequency modulation of the subcarrier and is a periodic function of a frequency $f_m$ (cycle $T_m = 1/f_m$).

The phase difference signal of Eq. (7) is time-differentiated and converted into a frequency difference and an average value $f_{avg}^D$ during one modulation cycle is calculated.

[Math. 9]

$$f_{avg}^D = \frac{1}{2\pi T_m} \int_{-T_m/2}^{T_m/2} \frac{d\Phi^D(t)}{dt} dt = \frac{2f_{sc}V}{c} \quad (9)$$

Although the frequency difference includes a component caused by the frequency modulation and a component caused by the Doppler shift, the average value during one modulation cycle becomes 0 and only the component caused by the Doppler shift remains because the former is an AC signal. Therefore, a speed V of the object 7 can be obtained from the average value of Eq. (9).

The component caused by the Doppler shift is eliminated from the phase difference signal $\Phi^D$ and an absolute average phase $\phi_{avg}^D$ is calculated.

[Math. 10]

$$\phi_{avg}^D = \frac{1}{T_m} \int_{-T_m/2}^{T_m/2} |\Phi^D(t) - 2\pi f_{avg}^D t| dt$$

$$= \frac{2\pi}{T_m} \int_{-T_m/2}^{T_m/2} \left| \int_0^t \{v_M(t') - v_M(t' - \tau_d)\} dt' \right| dt \quad (10)$$

In Eq. (10), the delay time $\tau_d$ is an unknown parameter to be obtained. The frequency modulation $v_M(t)$ of the subcarrier is known. For example, the frequency modulation $v_M(t)$ can be obtained in advance in a measurement method using the heterodyne interferometer described in Patent Literature 4. Although it is also possible to obtain the distance to the object 7 by executing a regression analysis process of Eq. (10) using the delay time $\tau_d$ as the unknown parameter, a method of calculating the distance from the absolute average phase using a smaller amount of calculation will be described.

In Eq. (10), when the delay time $\tau_d$ is sufficiently smaller than the frequency modulation cycle $T_m$ of the subcarrier, the integrand can be approximated as shown in the following equation.

[Math. 11]

$$\int_0^t \{v_M(t') - v_M(t' - \tau_d)\} dt' \approx \int_0^t \tau_d \frac{dv_M(t')}{dt'} dt' = \tau_d v_M(t) \quad (11)$$

The absolute average phase can also be approximated as shown in the following equation.

[Math. 12]

$$\phi_{avg}^D \approx \frac{2\pi \tau_d}{T_m} \int_{-T_m/2}^{T_m/2} |v_M(t)| dt \quad (12)$$

The integral of Eq. (12) is a constant determined in the frequency modulation of the subcarrier and can be obtained using the frequency modulation $v_M(t)$ measured in advance. Therefore, a distance L to the object can be calculated using the relational expression between the distance expressed by the following equation and the absolute average phase $\phi_{avg}^D$.

[Math. 13]

$$L = \frac{cT_m}{4\pi \int_{-T_m/2}^{T_m/2} |v_M(t)| dt} \phi_{avg}^D = \xi \phi_{avg}^D \quad (13)$$

Here, $\xi$ is a constant of proportionality that relates the distance and the absolute average phase.

As an example, a case where the frequency modulation $v_M(t)$ of the subcarrier is a sine wave of the following equation will be described.

[Math. 14]

$$v_M(t) = \frac{\Delta v}{2} \sin(2\pi f_m t) \quad (14)$$

Here, $\Delta v$ denotes a chirp bandwidth. By substituting Eq. (14) into Eq. (10), the relationship between the distance L and the absolute average phase $\phi_{avg}^D$ can be obtained without using an approximation.

[Math. 15]

$$L = \frac{c}{2\pi f_m} \sin^{-1} \frac{\pi f_m \phi_{avg}^D}{2\Delta v} \quad (15)$$

Because Eq. (15) includes the inverse trigonometric function which is a periodic function, the distance that can be uniquely calculated is limited by the following equation.

[Math. 16]

$$L \leq \frac{c}{4f_m} \quad (16)$$

In FMCW LiDAR of the prior art, a triangular wave or a sawtooth wave is used as a frequency-modulated signal. On the other hand, in the present embodiment, if the coefficient $\xi$ of proportionality is obtained in advance, any periodic function can be used as a signal without being limited to a triangular wave or a sawtooth wave. Although an averaging process in Eqs. (9) and (10) is associated with an integral value during one modulation cycle, an integral interval may be set to an integer multiple of the modulation cycle.

[Evaluation of Measurement Accuracy]

Figure 9:
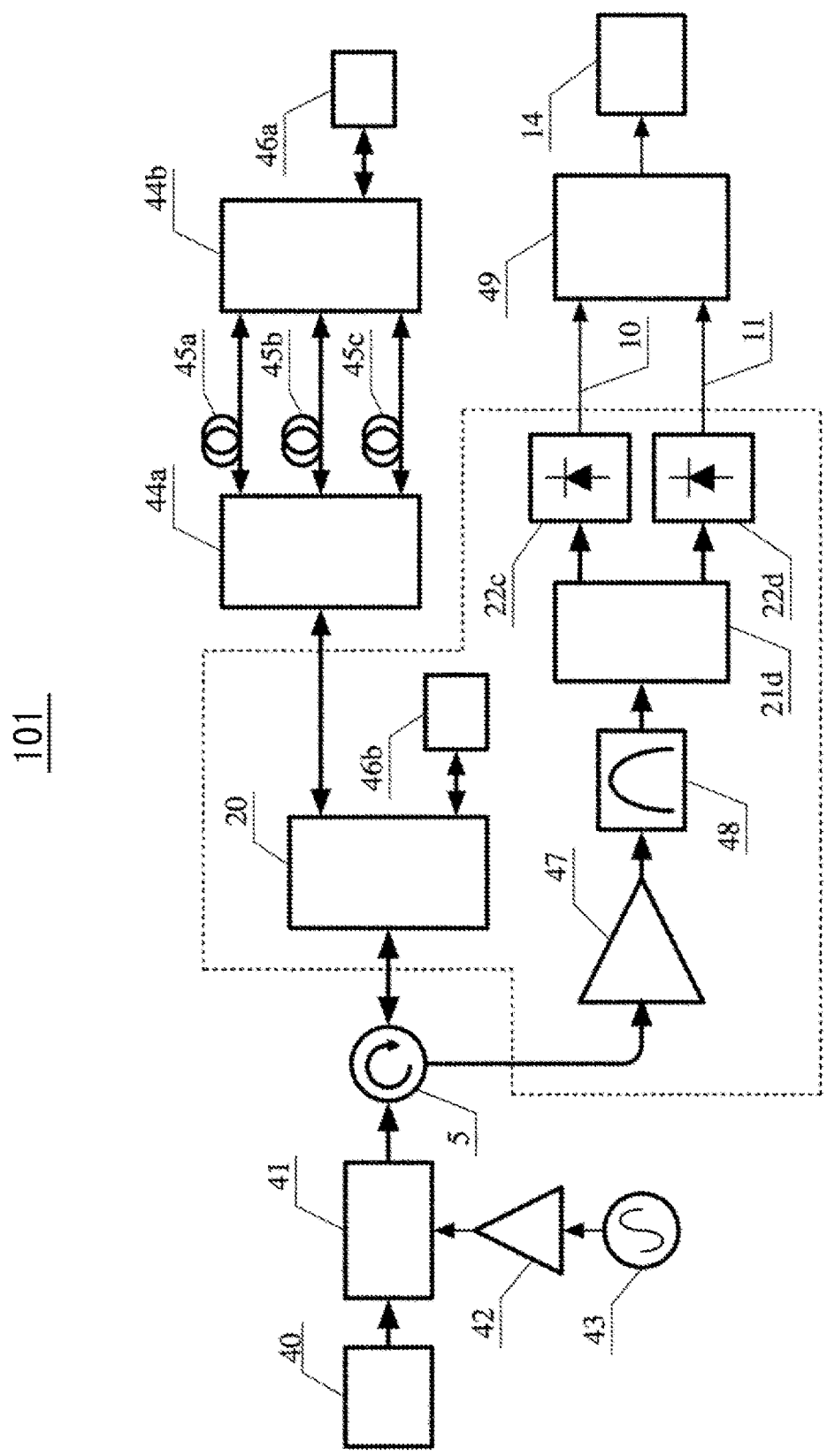
FIG. 9 is a diagram for describing a device for evaluating an optical measurement device according to a first embodiment.

For the first embodiment, an experiment was conducted to evaluate the distance measurement accuracy. FIG. 9 is a diagram for describing a device 101 for evaluating the optical measurement device used in the present experiment. The device 101 of FIG. 9 includes a DFB laser 40, a light intensity modulator 41, a light modulator driver 42, an analog signal generator 43, an optical circulator 5, an optical frequency shifter 20, 1×4 optical switches 44a and 44b, delayed optical fibers 45a, 45b, and 45c, Faraday rotating mirrors 46a and 46b, an optical amplifier 47, an optical bandpass filter 48, a light demultiplexer 21d, photodetectors 22c and 22d, a digital oscilloscope 49, and an arithmetic processing unit 14. A portion surrounded by the dotted line corresponds to the first example of the dual frequency beat signal generator 9.

The output light of the DFB laser 40 having a frequency of 193.300 THz is input to the light intensity modulator 41 and a carrier and a subcarrier are generated. The analog signal generator 43 drives the light intensity modulator 41 via the light modulator driver 42. The analog signal generator 43 has a function of integrating the modulation signal generator 17 and the subcarrier generation signal generator 18 in FIG. 3 and outputs a frequency-modulated sine wave signal having a frequency of 25 GHz. A frequency-fixed carrier and a frequency-modulated subcarrier are generated from the light intensity modulator 41 and a plurality of subcarriers are generated at a frequency separated by an integer multiple of 25 GHz from the carrier frequency of 193.300 THz. A sine wave having a frequency of 2.5 kHz is used for frequency modulation of the subcarrier and the chirp bandwidth is 100 MHz. In the measurement accuracy evaluation experiment, the carrier having a frequency of 193.300 THz is used as the first measurement light and the subcarrier having a frequency of 193.325 THz is used as the second measurement light.

The carrier and the subcarrier output from the light intensity modulator 41 are input to the optical frequency shifter 20 having a frequency shift of 100 MHz and 0th-order diffracted light is used as the probe light and first-order diffracted light is used as the reference light. The reference light is reflected by the Faraday rotating mirror 46b, passes through the optical frequency shifter 20 again, and is output from the optical circulator 5. After the probe light passes through any one of the three types of delayed optical fibers 45a, 45b, and 45c via the 1×4 optical switches 44a and 44b, the probe light is reflected by the Faraday rotating mirror 46a, passes through the same delayed optical fiber in a reverse direction, passes through the optical frequency shifter 20 again, and is output as a signal light from the optical circulator 5. A frequency difference between the signal light output from the optical circulator 5 and the reference light is 200 MHz. The lengths of the delayed optical fibers 45a, 45b, and 45c are 10 m, 120 m, and 1 km, respectively.

The signal light and the reference light output from the optical circulator 5 are amplified by the optical amplifier 47 and the naturally emitted light of the optical amplifier 47 is eliminated by the optical bandpass filter 48 and then input to the light demultiplexer 21d. The light demultiplexer 21d separates and outputs a carrier having a frequency of 193.300 THz and a subcarrier having a frequency of 193.325 THz. The separated carrier and subcarrier are input to the photodetectors 22c and 22d, respectively, and a complex beat signal is output. Each of the first complex beat signal 10 and the second complex beat signal 11 is input to the digital oscilloscope 49 and converted into a digital signal. The demodulation process for the complex beat signal, the generation of the phase difference signal, the elimination of phase noise, and the calculation of the distance to the object 7 and the speed of the object 7 are performed in offline processing using the arithmetic processing unit 14. For each of the three types of delayed optical fibers, 16 distance measurement processes are performed and the accuracy is evaluated from statistical variations.

Figure 10:
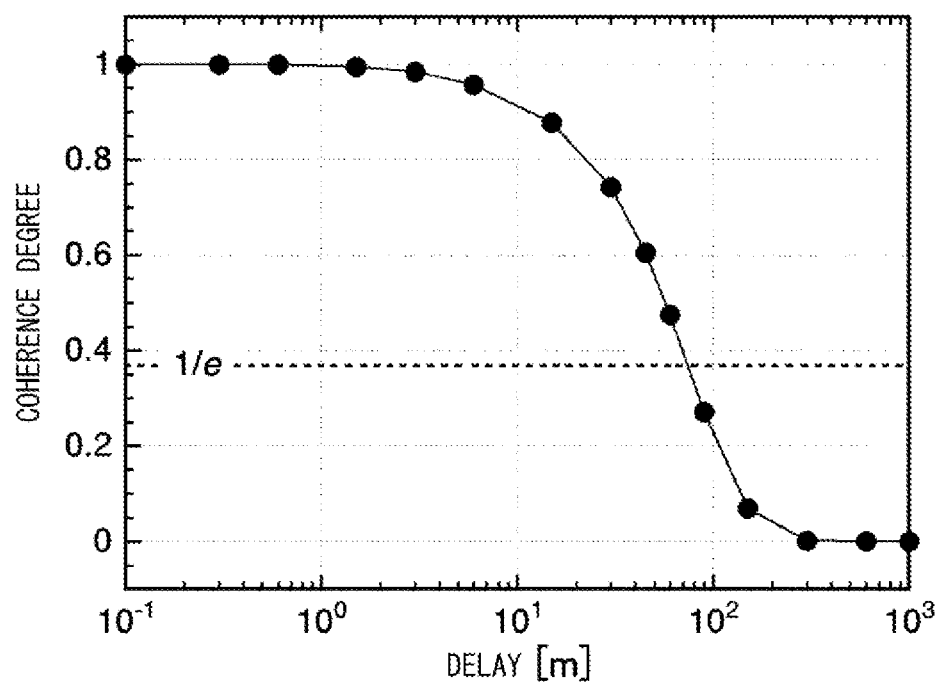
FIG. 10 is a diagram showing a degree of coherence of a distributed feedback (DFB) laser.

FIG. 10 is a diagram showing a degree of coherence of the DFB laser 40 and shows a result obtained by measuring and calculating the optical frequency noise of the DFB laser 40. The coherence length serving as standard for the maximum measurement distance is 70 m and the reciprocating fiber length into which the coherence length is converted is 24 m. Both delayed optical fibers 45b and 45c have an optical path length far exceeding the coherence length.

Figure 11:
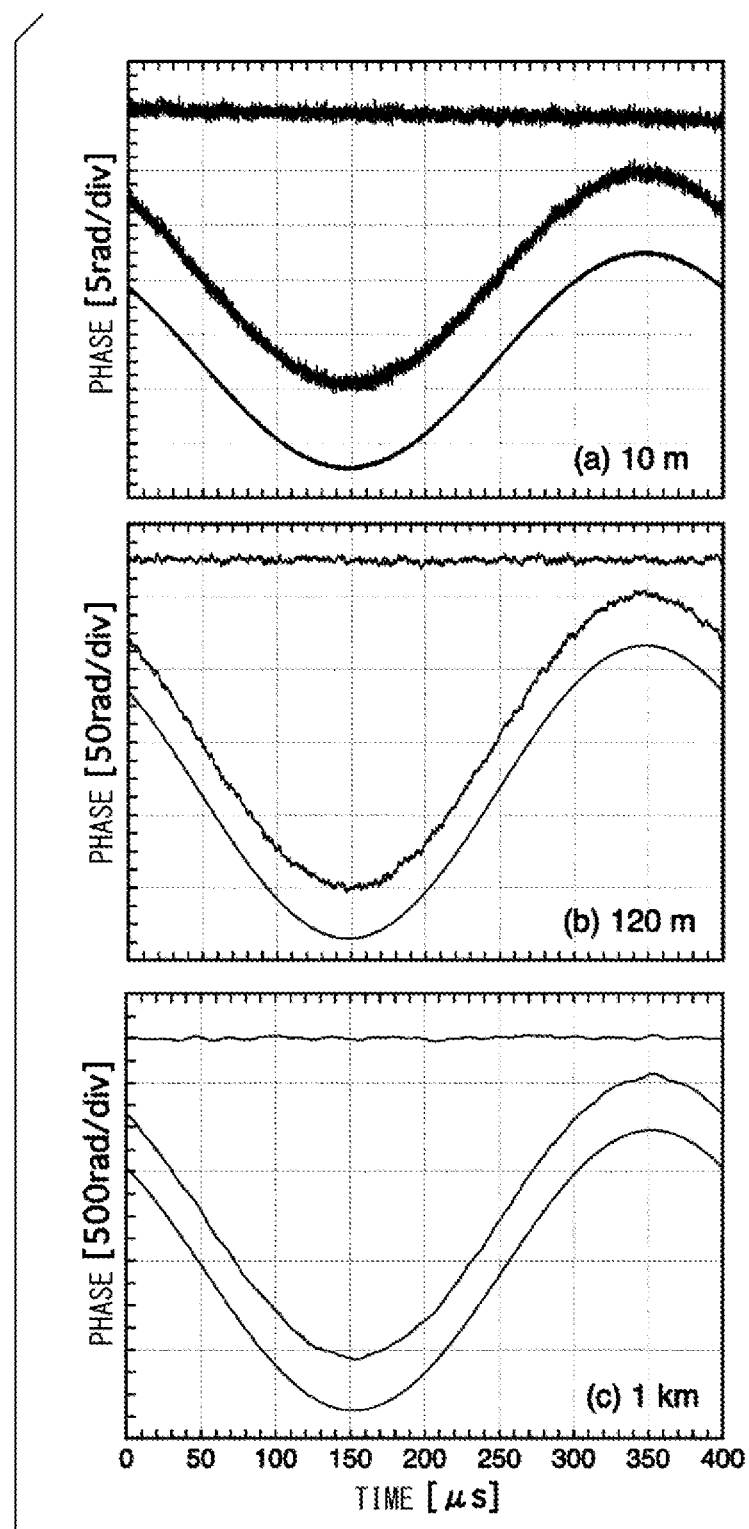

FIG. 11 is a diagram showing an example of results of measuring the carrier and subcarrier phases and the phase difference signal. FIG. 11(*a*) is a result for a delayed optical fiber of 10 m, FIG. 11(*b*) is a result for a delayed optical fiber of 120 m, and FIG. 11(*c*) is a result for a delayed optical fiber of 1 km. In each drawing, waveforms represent results for a carrier, a subcarrier, and a phase difference signal in order from the top. The phase noise of the DFB laser 40 appears in the phase of the carrier and a component caused by frequency modulation appears in the phase of the subcarrier in addition to the phase noise of the DFB laser 40. In the phase difference signal, the phase noise of the DFB laser 40 is eliminated and only the component caused by the frequency modulation appears clearly.

Figure 12:
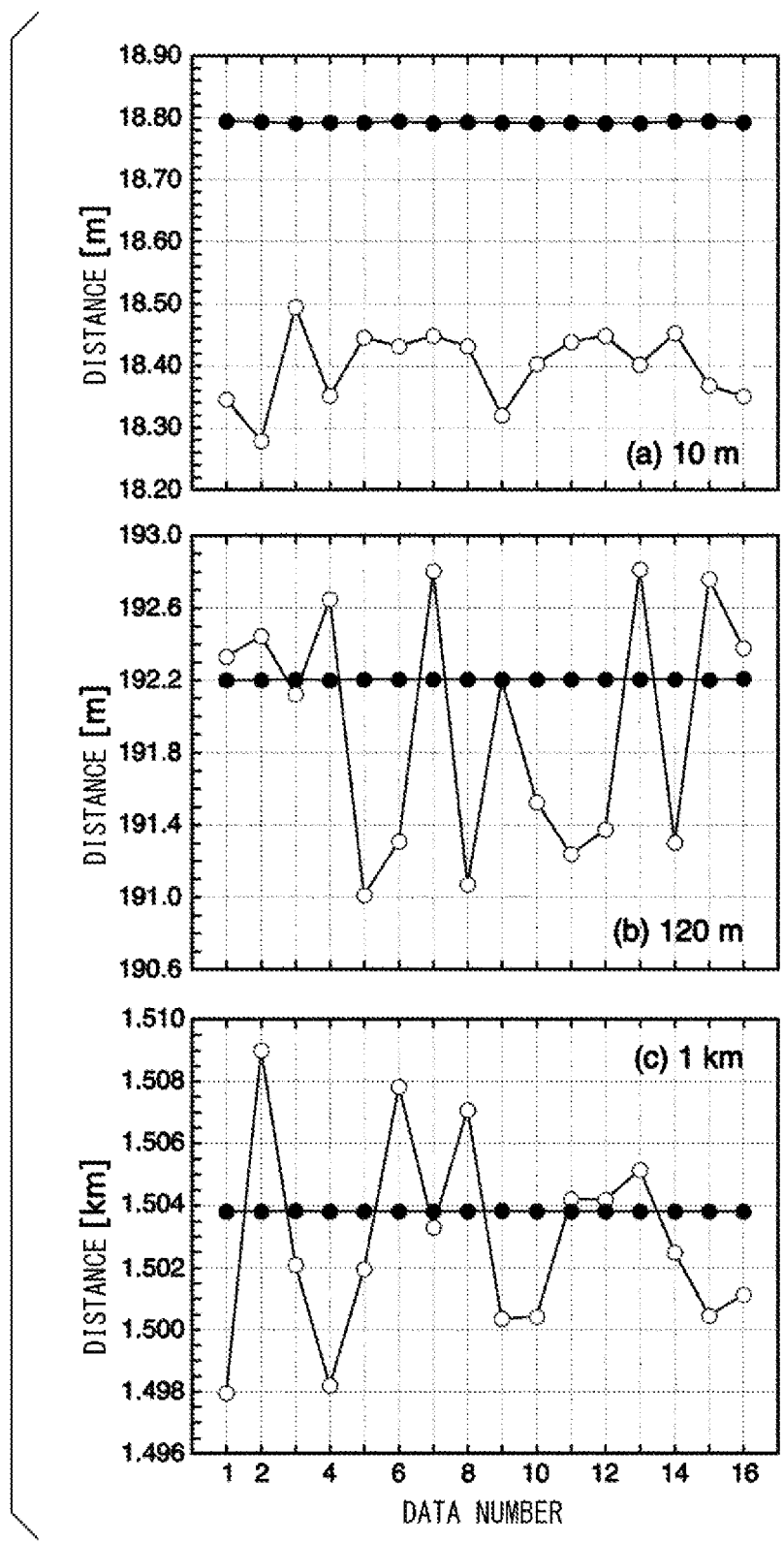

FIG. 12 is a diagram showing a distribution of measured distance values in 16 measurement processes. FIG. 12(*a*) is a result for a delayed optical fiber of 10 m, FIG. 12(*b*) is a result for a delayed optical fiber of 120 m, and FIG. 12(*c*) is a result for a delayed optical fiber of 1 km. A white circle represents a result calculated from a complex beat signal of a subcarrier and a black circle represents a result calculated from a phase difference signal. A calculated distance value represents an optical path length and includes an optical path length based on a refractive index (1.467) of the optical fiber and optical path lengths of the 1×4 optical switches 44a and 44b. The distance calculated from the subcarrier varies greatly from data to data and has a deviation of 0.3 to 0.4% from an average value of the entire data. Such a large error is due to the phase noise of the DFB laser 40. On the other hand, the influence of the phase noise of the DFB laser 40 on the distance calculated from the phase difference signal is eliminated and the variation for each measurement process is significantly reduced. As described above, the measurement accuracy is improved by eliminating the influence of the phase noise of the multi-frequency laser at the distance calculated from the phase of the difference signal represented by the "phase difference signal."

Figure 13:
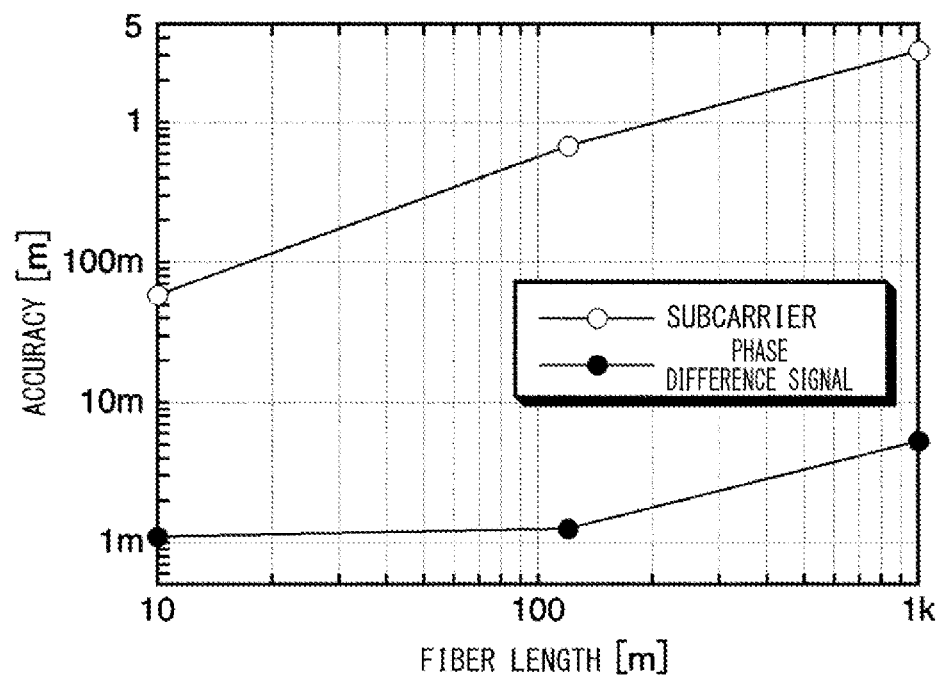
FIG. 13 is a diagram showing a relationship between distance measurement accuracy and a fiber length according to the first embodiment.

FIG. 13 is a diagram showing a relationship between the distance measurement accuracy and the fiber length. The measurement accuracy on the vertical axis represents the standard deviation of the 16 measured values. A white circle represents a case where the distance is calculated from the complex beat signal of the subcarrier and a black circle represents a case where the distance is calculated from the phase difference signal. When the distance is calculated from the complex beat signal of the subcarrier, the accuracy deteriorates with the fiber length and an error of 0.3 to 0.4% of the fiber length occurs. This is because the component caused by the phase noise of the DFB laser 40 increases with the fiber length. On the other hand, when the distance is calculated from the phase difference signal, the accuracy deteriorates with the fiber length, but the accuracy is improved by two or more orders of magnitude as compared to the case of the subcarrier, and the accuracy of 1 cm or less is obtained for all fiber lengths. Even if the distance is calculated from the phase difference signal, the accuracy deteriorates depending on the fiber length because of the phase noise of the analog signal generator 43 represented by the fourth term of Eq. (6). As in the case of the phase noise of the DFB laser 40, the component caused by the phase noise of the analog signal generator 43 also increases with the fiber length. As shown in Eq. (7), if the phase noise of the subcarrier generation signal generator is made smaller than the background noise, the accuracy independent of the fiber length can be implemented.

In FMCW LiDAR of the prior art, a chirp bandwidth of 10 GHz or more is required to implement an accuracy of 1 cm or less. In the present embodiment, the equivalent accuracy is implemented even in a chirp bandwidth of 100 MHz. Because a beat frequency measured in FMCW LiDAR is proportional to the chirp bandwidth, the band of the beat signal can be reduced by reducing the chirp bandwidth and the band required for signal processing can be limited.

Figure 14:
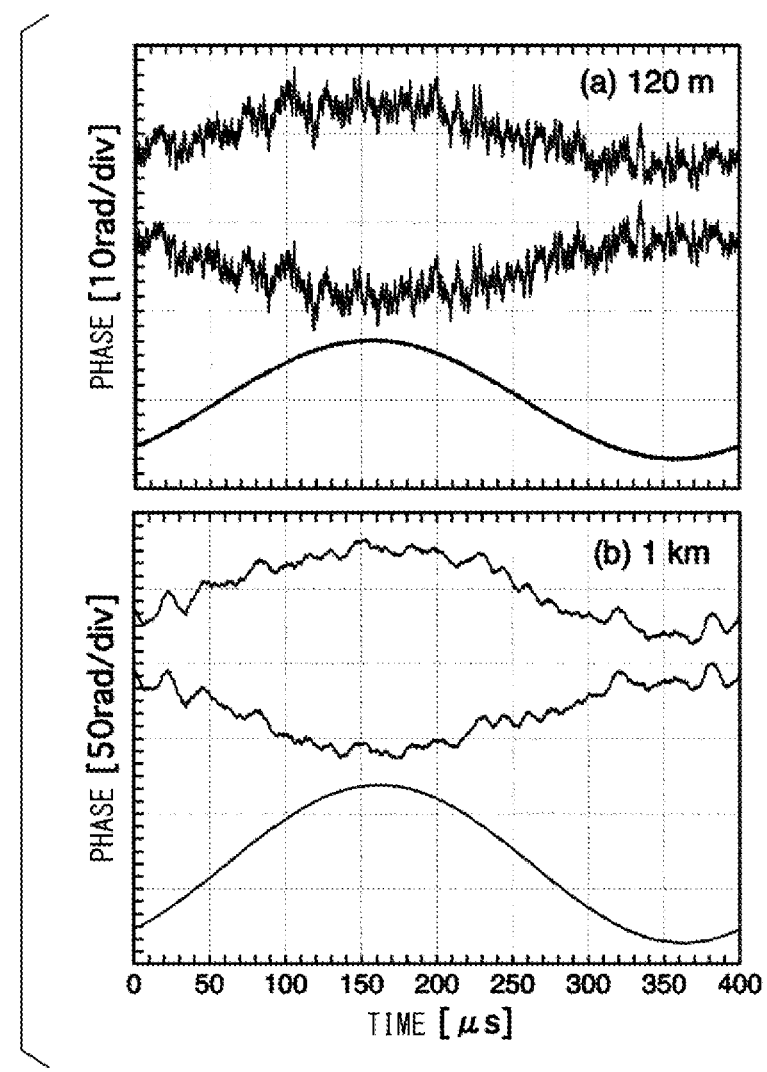
FIG. 14 is a diagram showing an example of results of measuring a phase of a subcarrier and a phase difference signal when all frequency-modulated subcarriers are used as first and second measurement light.

Similar measurement is possible even if frequency-modulated subcarriers are used as the first and second measurement light. FIG. 14 is a diagram showing an example of results of measuring a phase of a subcarrier and a phase difference signal when a subcarrier (193.275 THz) located on the low-frequency side of the carrier is used as the first measurement light and a subcarrier (193.325 THz) located on the high-frequency side of the carrier is used as the second measurement light. The modulation frequency of the subcarrier is 2.5 kHz and the chirp bandwidth is 5 MHz. FIG. 14(a) is a result for the delayed optical fiber of 120 m and FIG. 14(b) is a result for the delayed optical fiber of 1 km. In each drawing, the waveforms represent results for the low-frequency side subcarrier, the high-frequency side subcarrier, and the phase difference signal in order from the top. It can be seen that, in the subcarriers on the low-frequency side and the high-frequency side, the component caused by the phase noise of the DFB laser 40 are in phase and the component caused by the frequency modulation are in antiphase. In the phase difference signal, the phase noise of the DFB laser 40 is canceled out and the component due to the frequency modulation appears clearly. Also, because both the first measurement light and the second measurement light contain the component caused by frequency modulation, the amplitude of the phase difference signal is doubled as compared with the case of the combination of the carrier and the subcarrier shown in FIG. 11.

Second Embodiment

In the present embodiment, a case where a speed and a distance are calculated in an arithmetic process in a frequency domain using a difference frequency signal (a secondary beat signal) between first and second complex beat signals as a difference signal will be described. In the present embodiment, an example in which the dual frequency beat signal generator 9 (see FIG. 4 or FIG. 5(a)) and the second example of the difference signal generator 12 (see FIG. 7) are used in the optical measurement device of FIG. 1 will be described. As a process for the difference signal 13 performed by the arithmetic processing unit 14, a method used for FMCW LiDAR of the prior art can be used.

Detailed description will be given using mathematical equations. In the following description, a frequency-fixed carrier is used as first measurement light and a frequency-modulated subcarrier is used as second measurement light. The symbol of the superscript "c" denotes a physical quantity for a carrier and the symbol of the superscript "sc" denotes a physical quantity for a subcarrier. Also, for ease of description, a case where the component caused by the phase noise of the subcarrier generation signal generator 18 appearing in Eq. (6) and the background noise appearing in Eq. (7) are excluded is considered. Because these two noise components appear as white noise, there is no problem even if a case where they are excluded is considered when a frequency value is obtained in an arithmetic process in a frequency domain.

From Eq. (5), a frequency of a complex beat signal generated from the first measurement light can be expressed by the following equation.

[Math. 17]

$$v^c(t) = \frac{1}{2\pi} \frac{d\Phi^c(t)}{dt} \qquad (17)$$
$$= \frac{1}{2\pi} \frac{d\{\theta_N(t) - \theta_N(t - \tau_d)\}}{dt} + \frac{2v_0 V}{c}$$

Here, the first term represents a component caused by phase noise of the multi-frequency laser 1 and the second term represents a Doppler shift Likewise, from Eq. (6), the frequency of the complex beat signal generated from the second measurement light can be expressed by the following equation.

[Math. 18]

$$v^{sc}(t) = \frac{1}{2\pi} \frac{d\Phi^{sc}(t)}{dt} \qquad (18)$$
$$= \frac{1}{2\pi} \frac{d\{\theta_N(t) - \theta_N(t - \tau_d)\}}{dt} + \frac{2(v_0 + f_{sc})V}{c} + \frac{1}{2\pi} \frac{d\phi_M(t)}{dt}$$

Here, the first term represents a component caused by the phase noise of the multi-frequency laser 1, the second term represents a Doppler shift, and the third term represents a component caused by the frequency modulation of the subcarrier.

According to Eqs. (17) and (18), a frequency $v^D(t)$ of a difference frequency signal, which is a difference between the frequency of the first complex beat signal generated from the first measurement light and the frequency of the second complex beat signal generated from the second measurement light, can be expressed by the following equation.

[Math. 19]

$$v^D(t) = v^{sc}(t) - v^c(t) = \frac{2f_{sc}V}{c} + \frac{1}{2\pi} \frac{d\phi_M(t)}{dt} \qquad (19)$$

Here, the first term represents the Doppler shift, the second term represents the component caused by the frequency modulation of the subcarrier, and the component caused by the phase noise of the multi-frequency laser is completely eliminated. Also, because the center frequencies of the carrier and the subcarrier are different, the Doppler shift corresponding to $f_{sc}$, which is the frequency difference between the two center frequencies, remains.

Figure 15:
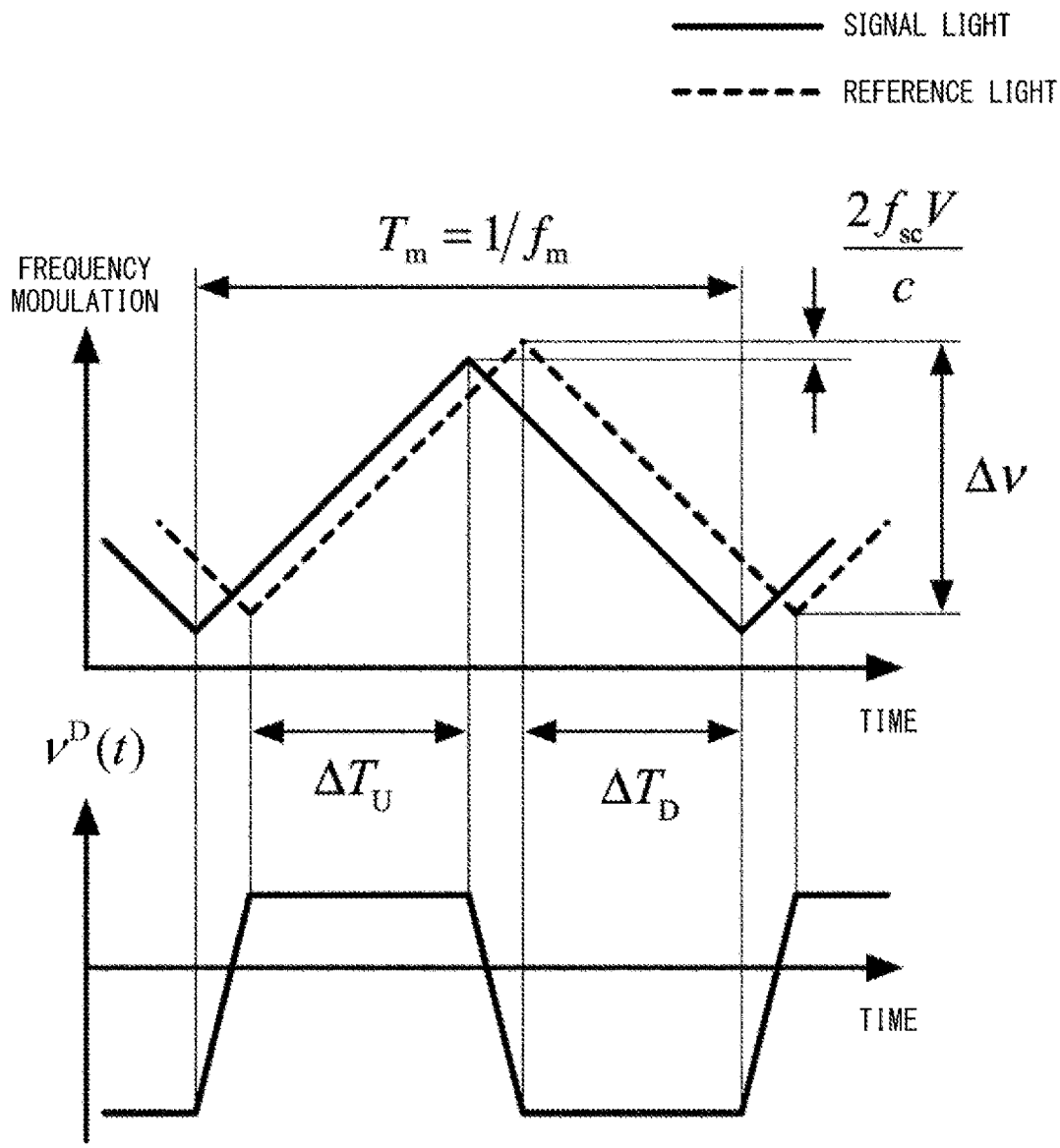
FIG. 15 is a diagram for describing frequency modulation of signal light caused by second measurement light and reference light and a frequency $v^D(t)$ of a difference frequency signal according to a second embodiment.

In the present embodiment, a triangular wave or a sawtooth wave is used as the frequency modulation signal of the subcarrier. Here, a case where a triangular wave is used will be described. If the object 7 is stationary and does not cause a Doppler shift, a sawtooth wave can be used. FIG. 15 is a diagram for describing frequency modulation of the signal light caused by the second measurement light and the reference light and the frequency of the difference frequency signal. Here, $T_m$ denotes a modulation cycle of the triangular wave and Av denotes a chirp bandwidth. Due to the frequency modulation based on the triangular wave, an up chirp and a down chirp are alternately repeated in the reference light and the signal light. Because the signal light has a time delay with respect to the reference light, a time domain in which a difference frequency has a constant value and a time domain in which a difference frequency changes from a positive value to a negative value or from a negative value to a positive value appear alternately. To calculate the speed and the distance, time domains of $\Delta T_U$ and $\Delta T_D$ in which the difference frequency has a constant value are used.

In the time domain $\Delta T_U$ corresponding to the up chirp, the frequency of the difference frequency signal can be expressed by the following equation.

[Math. 20]
$$f_{up} = \frac{2f_{sc}V}{c} + \frac{\Delta v}{T_m/2}\tau_d \quad (20)$$

Here, the first term represents the Doppler shift and the second term represents a component caused by the frequency modulation of the subcarrier.

In the time domain $\Delta T_D$ corresponding to the down chirp, the frequency of the difference frequency signal can be expressed by the following equation.

[Math. 21]
$$f_{down} = \frac{2f_{sc}V}{c} - \frac{\Delta v}{T_m/2}\tau_d \quad (21)$$

Here, the first term represents the Doppler shift and the second term represents a component caused by the frequency modulation of the subcarrier.

The line spectrum appears at the position corresponding to the frequency component contained in the difference frequency signal by extracting the time domain $\Delta T_U$ and $\Delta T_D$ from the difference signal 13 (the difference frequency signal) output from the difference signal generator 12 and performing a spectral analysis process for the data in each time domain. A frequency value of a line spectrum will be referred to as a peak frequency. Even if there is scattered light from a plurality of objects having different distances, it is possible to measure a plurality of peak frequencies and detect the objects separately.

The speed of the object 7 and the distance to the object 7 can be calculated by the following equations from the frequency of the difference frequency signal for the up chirp and the down chirp obtained from the data of the time domains $\Delta T_U$ and $\Delta T_D$.

[Math. 22]
$$V = \frac{c(f_{up} + f_{down})}{4f_{sc}} \quad (22)$$
$$L = \frac{c\tau_d}{2} = \frac{cT_m(f_{up} - f_{down})}{8\Delta v}$$

[Operation Demonstration Experiment]

Figure 16:
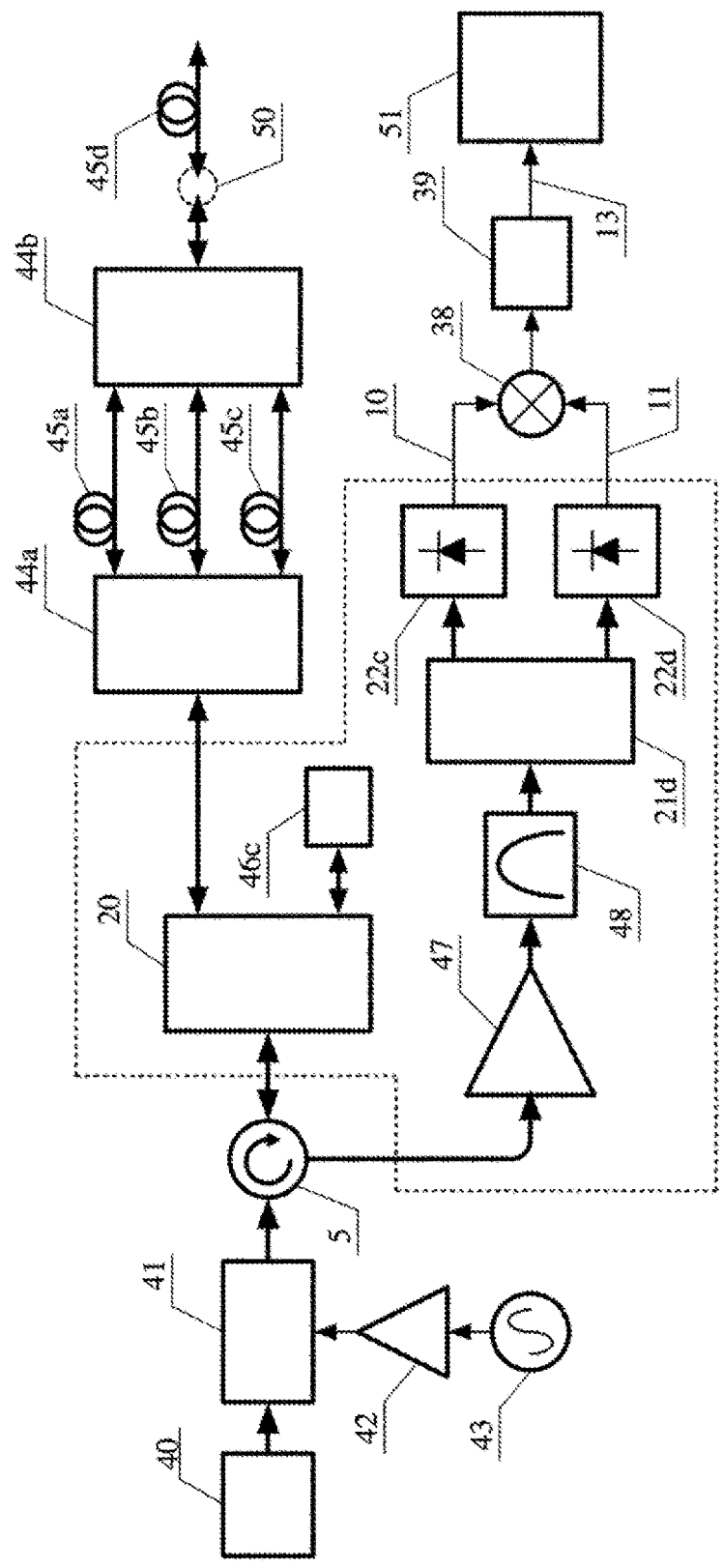
FIG. 16 is a diagram for describing a device for evaluating an optical measurement device according to the second embodiment.

For the second embodiment, an experiment was conducted to demonstrate the operation of phase noise elimination. FIG. 16 is a diagram for describing a device 102 for evaluating an optical measurement device used in the present experiment. The device of FIG. 16 includes a DFB laser 40, a light intensity modulator 41, a light modulator driver 42, an analog signal generator 43, an optical circulator 5, an optical frequency shifter 20, 1×4 optical switches 44a and 44b, delayed optical fibers 45a, 45b, 45c, and 45d, a Faraday rotating mirror 46c, an optical amplifier 47, an optical bandpass filter 48, a light demultiplexer 21d, photodetectors 22c and 22d, a frequency mixer 38, a low pass filter 39, and a spectrum analyzer 51. The portion surrounded by the dotted line corresponds to the first example of the dual frequency beat signal generator 9.

The output light of the DFB laser 40 having a frequency of 193.300 THz is input to the light intensity modulator 41 and a carrier and a subcarrier are generated. The analog signal generator 43 outputs a sine wave signal having a frequency of 25 GHz and has a frequency modulation function. A frequency-fixed carrier and a frequency-modulated subcarrier are generated from the light intensity modulator 41 and a plurality of subcarriers are generated at a frequency separated by an integer multiple of 25 GHz from a carrier frequency of 193.300 THz. A triangular wave having a frequency of 250 Hz is used as the modulation frequency of the subcarrier and a chirp bandwidth is 256 MHz. A carrier having a frequency of 193.300 THz is used as first measurement light and a subcarrier having a frequency of 193.325 THz is used as second measurement light.

The carrier and the subcarrier output from the light intensity modulator 41 are input to the optical frequency shifter 20 having a frequency shift of 100 MHz and $0^{th}$-order diffracted light is used as probe light and first-order diffracted light is used as reference light. The reference light is reflected by the Faraday rotating mirror 46c, passes through the optical frequency shifter 20 again, and is output from the optical circulator 5. The probe light passes through any one of the three types of delayed optical fibers 45a, 45b, and 45c and the delayed optical fiber 45d via the 1×4 optical switches 44a and 44b. A connection gap 50 of the optical connector is disposed between the output of the 1×4 optical switch 44b and the delayed optical fiber 45d and the Fresnel reflected light from the output end of the 1×4 optical switch 44b and the Fresnel reflected light from the output end of the delayed optical fiber 45d pass through the same optical path in a reverse direction, pass through the optical frequency shifter 20 again, and are output as a signal light from the optical circulator 5. That is, the device of FIG. 16 has two reflection points. The lengths of the delayed optical fibers 45a, 45b, 45c, and 45d are 10 m, 120 m, 1 km, and 2 m, respectively. A frequency difference between the signal light output from the optical circulator 5 and the reference light is 200 MHz.

The signal light output from the optical circulator 5 and the reference light are amplified by the optical amplifier 47, naturally emitted light of the optical amplifier 47 is eliminated by the optical bandpass filter 48 and then input to the light demultiplexer 21d. The light demultiplexer 21d separates and outputs a carrier having a frequency of 193.300 THz and a subcarrier having a frequency of 193.325 THz. The separated carrier and subcarrier are input to the photodetectors 22c and 22d, respectively, and a complex beat signal is output. After the first complex beat signal 10 and the second complex beat signal 11 are input to the frequency mixer 38, a sum frequency signal is eliminated by the low pass filter 39 and an obtained difference frequency signal is output as the difference signal 13. The difference frequency signal is input to the spectrum analyzer 51 and a spectrum is calculated.

FIG. 17(a) is a diagram showing a spectrum of the second complex beat signal 11. Three spectra shown in FIG. 17(a) represent results for delayed optical fiber lengths of 10 m, 120 m, and 1 km from the top. In the delayed optical fiber length of 10 m, the optical path length is smaller than the coherence length of the DFB laser 40, so that the line spectral component appears in the center. If the vicinity of the center of the spectrum is magnified and observed, spectra caused by the two reflection points are observed separately. At the delayed optical fiber lengths of 120 m and 1 km, a line spectrum component disappears and a Lorentz-type spectrum having a full width at half maximum of 3.06 MHz appears. Because the optical path length of the delayed optical fiber is much larger than the coherence length of the DFB laser 40, the spectral spread corresponding to twice the spectral line width of the DFB laser 40 is generated. At the delayed optical fiber lengths of 120 m and 1 km, the two reflection points cannot be separated because the spectral spread is much larger than the distance between the spectra caused by the two reflection points.

Figure 17:
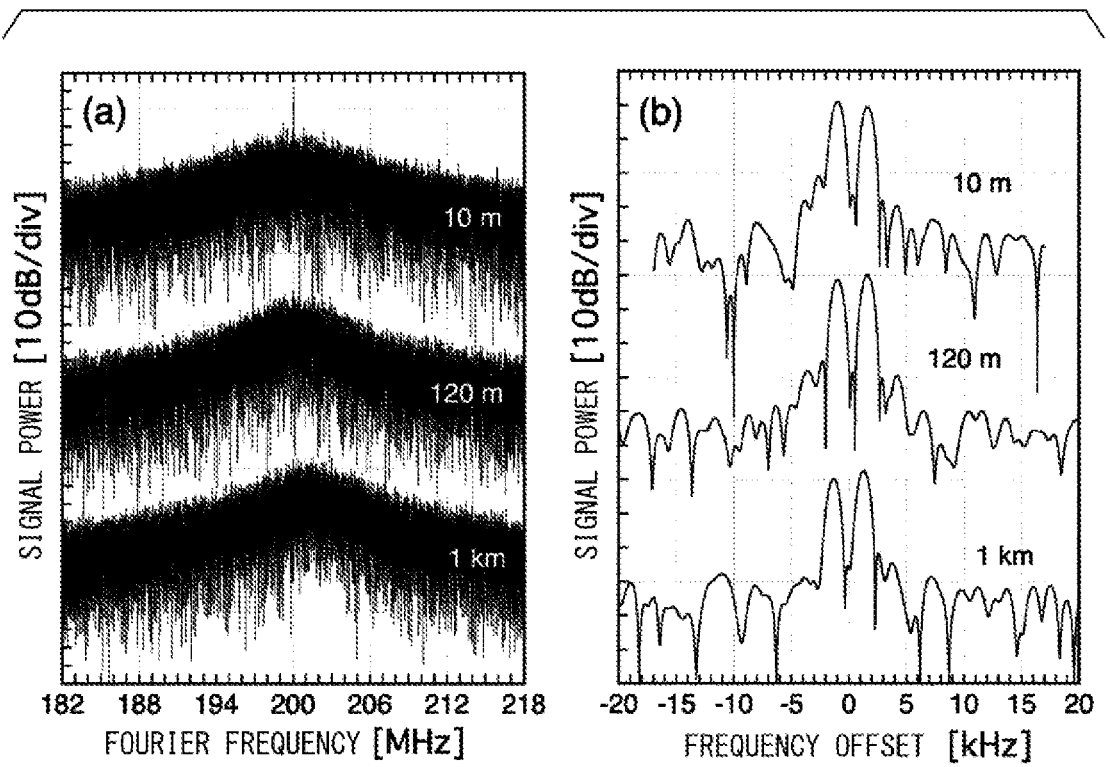

FIG. 17(*b*) is a diagram showing a spectrum of the difference frequency signal. Three spectra shown in FIG. 17(*b*) represent results for delayed optical fiber lengths of 10 m, 120 m, and 1 km from the top. In any of the delayed optical fiber lengths, the two line spectra appear separately and the distance between the line spectra corresponds to the delayed optical fiber 45*d* having a length of 2 m. Because the phase noise is eliminated from the difference frequency signal, spectra having the same shape can be observed regardless of the measured distance. It is indicated that the full width at half maximum of the two line spectra is equal to the resolution bandwidth of the spectrum analyzer 51 and the phase noise of the DFB laser 40 is completely eliminated.

Although the configuration of the heterodyne interferometer of FIG. 4 has been described as the dual frequency beat signal generator 9 in the first and second embodiments, the same can be applied even if the configuration of the homodyne interferometer of FIG. 5 is used. Although the case where a semiconductor laser and a light intensity modulator are used as a multi-frequency light source has been described, the same can be applied to a semiconductor laser for performing direct modulation according to an injection current or a light source having a modulation function of generating a subcarrier.

The examples shown in the above-described embodiment and the like have been described for the sake of easy understanding of the invention and the present invention is not limited to the embodiment.

INDUSTRIAL APPLICABILITY

Because the optical measurement device and a method of the present invention can completely eliminate the phase noise of the laser, the accuracy is high. Also, because a complicated device and process for reducing or eliminating the phase noise of the laser are not required, the present invention is industrially useful as a compact and low-price FMCW LiDAR system. The present invention can be used for environment recognition sensors for vehicles, autonomous robots, and the like and can be used for consumer equipment and the like.

REFERENCE SIGNS LIST

1 Multi-frequency laser
2*a*, 2*b*, 2*c*, 2*d*, 2*e*, 2*f* Beam splitter
3 Probe light
4 Reference light
5 Optical circulator
6 Transmission/reception optics
7 Object
8 Signal light
9 Dual frequency beat signal generator
10 First complex beat signal
11 Second complex beat signal
12 Difference signal generator
13 Difference signal
14 Arithmetic processing unit
15 Single frequency laser
16 Optical modulator
17 Modulation signal generator
18 Subcarrier generation signal generator
19 Semiconductor laser
20 Optical frequency shifter
21*a*, 21*b*, 21*c*, 21*d* Light demultiplexer
22*a*, 22*b*, 22*c*, 22*d* Photodetector
23 Reference light derived from first measurement light
24 Reference light derived from second measurement light
25 Signal light derived from first measurement light
26 Signal light derived from second measurement light
27*a*, 27*b* Phase diversity detector
28 π/2 phase shifter
29*a*, 29*b* Total internal reflection mirror
30*a*, 30*b* Balanced photodetector
31 In-phase component of complex beat signal
32 Quadrature component of complex beat signal
33 Imaginary unit multiplier
34 Adder
35 Complex beat signal
36*a*, 36*b* Phase demodulator
37 Subtractor
38 Frequency mixer
39 Low pass filter
40 DFB laser
41 Light intensity modulator
42 Light modulator driver
43 Analog signal generator
44*a*, 44*b* Optical switch
45*a*, 45*b*, 45*c*, 45*d* Delayed optical fiber
46*a*, 46*b*, 46*c* Faraday rotating mirror
47 Optical amplifier
48 Optical bandpass filter
49 Digital oscilloscope
50 Connection gap
51 Spectrum analyzer
100 Optical measurement device
101 Device for evaluating optical measurement device
102 Device for evaluating optical measurement device

The invention claimed is:

1. An optical measurement device comprising:
a multi-frequency laser configured to simultaneously generate a frequency-fixed carrier and at least one frequency-modulated subcarrier, either the carrier or the subcarrier within output light of the multi-frequency laser being used as first measurement light, either the carrier or the subcarrier having a frequency different from that of the first measurement light being used as second measurement light;
an optical branching element configured to divide the output light of the multi-frequency laser into two parts, one of the two parts being a reference light, and other of the two parts being a probe light;
an optical system configured to apply the probe light to an object and output scattered light from the object as a signal light;
a dual frequency beat signal generator configured to input the reference light and the signal light and separate and output a first complex beat signal derived from the first measurement light and a second complex beat signal derived from the second measurement light;

a difference signal generator configured to output a difference signal between the first complex beat signal and the second complex beat signal; and an arithmetic processing unit configured to execute at least one of an arithmetic process of calculating a speed of the object from the difference signal and an arithmetic process of calculating a distance to the object from the difference signal, wherein the multi-frequency laser includes:
  a single frequency laser;
  an optical modulator;
  a modulation signal generator that is a signal source for applying frequency modulation to the subcarrier; and
  a subcarrier generation signal generator configured to drive the optical modulator and generate the subcarrier for output light of the single frequency laser.

2. The optical measurement device according to claim 1, wherein the difference signal is either a phase difference signal between the first complex beat signal and the second complex beat signal or a difference frequency signal that is a beat signal generated by mixing the first complex beat signal with the second complex beat signal.

3. The optical measurement device according to claim 1, wherein the dual frequency beat signal generator has a configuration of a heterodyne interferometer.

4. The optical measurement device according to claim 1, wherein the dual frequency beat signal generator has a configuration of a homodyne interferometer including a phase diversity detector.

5. The optical measurement device according to claim 1, wherein the difference signal generator includes:
  a first phase demodulator configured to input the first complex beat signal and demodulate a phase thereof;
  a second phase demodulator configured to input the second complex beat signal and demodulate a phase thereof; and
  a subtractor configured to output a phase difference signal between the first and second complex beat signals as the difference signal.

6. The optical measurement device according to claim 1, wherein the difference signal generator includes:
  a frequency mixer configured to perform a multiplication process for the first complex beat signal and the second complex beat signal and output a sum frequency signal and a difference frequency signal of both signals; and
  a low pass filter configured to eliminate the sum frequency signal and output the difference frequency signal as the difference signal.

7. An optical measurement device comprising:
a multi-frequency laser configured to simultaneously generate a frequency-fixed carrier and at least one frequency-modulated subcarrier, either the carrier or the subcarrier within output light of the multi-frequency laser being used as first measurement light, either the carrier or the subcarrier having a frequency different from that of the first measurement light being used as second measurement light;

an optical branching element configured to divide the output light of the multi-frequency laser into two parts, one of the two parts being a reference light, and other of the two parts being a probe light;

an optical system configured to apply the probe light to an object and output scattered light from the object as a signal light;

a dual frequency beat signal generator configured to input the reference light and the signal light and separate and output a first complex beat signal derived from the first measurement light and a second complex beat signal derived from the second measurement light;

a difference signal generator configured to output a difference signal between the first complex beat signal and the second complex beat signal; and an arithmetic processing unit configured to execute at least one of an arithmetic process of calculating a speed of the object from the difference signal and an arithmetic process of calculating a distance to the object from the difference signal, wherein the multi-frequency laser includes:
  a semiconductor laser;
  a modulation signal generator that is a signal source for applying frequency modulation to the subcarrier; and
  a subcarrier generation signal generator configured to modulate an output of the semiconductor laser.

8. The optical measurement device according to claim 7, wherein the difference signal is either a phase difference signal between the first complex beat signal and the second complex beat signal or a difference frequency signal that is a beat signal generated by mixing the first complex beat signal with the second complex beat signal.

9. The optical measurement device according to claim 7, wherein the dual frequency beat signal generator has a configuration of a heterodyne interferometer.

10. The optical measurement device according to claim 7, wherein the dual frequency beat signal generator has a configuration of a homodyne interferometer including a phase diversity detector.

11. The optical measurement device according to claim 7, wherein the difference signal generator includes:
  a first phase demodulator configured to input the first complex beat signal and demodulate a phase thereof;
  a second phase demodulator configured to input the second complex beat signal and demodulate a phase thereof; and
  a subtractor configured to output a phase difference signal between the first and second complex beat signals as the difference signal.

12. The optical measurement device according to claim 7, wherein the difference signal generator includes:
  a frequency mixer configured to perform a multiplication process for the first complex beat signal and the second complex beat signal and output a sum frequency signal and a difference frequency signal of both signals; and
  a low pass filter configured to eliminate the sum frequency signal and output the difference frequency signal as the difference signal.

13. An optical measurement method comprising the steps of:
  dividing light of a multi-frequency laser configured to simultaneously generate a frequency-fixed carrier and at least one frequency-modulated subcarrier into two parts, defining one of the two parts as reference light, and defining other of the two parts as probe light;
  applying the probe light to an object and defining a scattered light from the object as a signal light;
  defining either the carrier or the subcarrier of an output light of the multi-frequency laser as a first measurement light, and defining either the carrier or the subcarrier having a frequency different from that of the first measurement light as a second measurement light;
  inputting the signal light and the reference light and generating a first complex beat signal and a second complex beat signal between the signal light and the reference light with respect to the first measurement light and the second measurement light;

generating a difference signal between the first complex beat signal derived from the first measurement light and the second complex beat signal derived from the second measurement light; and obtaining at least one of a speed of the object and a distance to the object from the difference signal, wherein the first complex beat signal and the second complex beat signal are generated using a configuration of either a heterodyne interferometer or a homodyne interferometer.

14. The optical measurement method according to claim 13, wherein the difference signal is either a phase difference signal between the first complex beat signal and the second complex beat signal or a difference frequency signal that is a beat signal generated by mixing the first complex beat signal with the second complex beat signal.

15. The optical measurement method according to claim 13, wherein a phase difference signal that is the difference signal is time-differentiated and converted into a frequency difference signal, a Doppler shift is calculated using an average value of the frequency difference signal, and the speed is obtained using the Doppler shift.

16. The optical measurement method according to claim 13, wherein a phase difference signal that is the difference signal is time-differentiated and converted into a frequency difference signal, a Doppler shift is obtained using an average value of the frequency difference signal, an average value of absolute values after a component of the Doppler shift is eliminated from the phase difference signal is obtained, and a distance to the object is calculated on the basis of a constant of proportionality of distance calculation obtained in advance.

17. The optical measurement method according to claim 13, wherein at least one of an arithmetic process of calculating a speed of the object from a frequency spectrum of a difference frequency signal that is the difference signal and an arithmetic process of calculating a distance to the object from the frequency spectrum of the difference frequency signal that is the difference signal is executed.

18. The optical measurement method according to claim 13, wherein frequency modulation is associated with any one of a sine wave, a triangular wave, and a sawtooth wave.

* * * * *